(12) United States Patent
Mory et al.

(10) Patent No.: US 6,745,809 B1
(45) Date of Patent: Jun. 8, 2004

(54) TIRE BUFFING APPARATUS

(75) Inventors: Steven W. Mory, Muscatine, IA (US);
Kelly Darin Gubser, Muscatine, IA (US); Andy Wayne Turner, Iowa City, IA (US)

(73) Assignee: Bandag Licensing Corporation, Muscatine, IA (US)

( * ) Notice: Subject to any disclaimer, the term of this patent is extended or adjusted under 35 U.S.C. 154(b) by 0 days.

(21) Appl. No.: 10/315,344

(22) Filed: Dec. 9, 2002

(51) Int. Cl.[7] ............................................... B29D 30/68
(52) U.S. Cl. ............................................. 157/13; 157/1
(58) Field of Search ....................................... 157/13, 1

(56) References Cited

U.S. PATENT DOCUMENTS

| | | | |
|---|---|---|---|
| 1,827,637 A | | 10/1931 | Andrews |
| 2,633,675 A | | 7/1953 | Ellis |
| 2,864,445 A | | 12/1958 | Hawkinson |
| 3,618,654 A | | 11/1971 | Meserve |
| 3,623,469 A | | 11/1971 | Niles |
| 3,675,706 A | * | 7/1972 | Cahill .......................... 157/13 |
| 3,766,690 A | | 10/1973 | Meserve |
| 3,835,591 A | | 9/1974 | Cimprich |
| 3,867,792 A | | 2/1975 | Pelletier |
| 3,877,506 A | | 4/1975 | Mattox et al. |
| 3,965,959 A | | 6/1976 | Weir |
| 3,993,116 A | | 11/1976 | Brewer |
| 4,071,071 A | | 1/1978 | Graves et al. |
| 4,116,256 A | | 9/1978 | Morris et al. |
| 4,126,171 A | | 11/1978 | Sorenson |
| 4,679,358 A | | 7/1987 | Sieradzki |
| 4,693,038 A | | 9/1987 | Vetter |
| 4,723,376 A | | 2/1988 | Blum et al. |
| 4,902,313 A | * | 2/1990 | Penter .......................... 95/149 |
| 5,238,041 A | * | 8/1993 | Tomita et al. ................. 157/13 |
| 5,277,727 A | | 1/1994 | Seiler et al. |
| 5,307,854 A | | 5/1994 | Brewer |
| 5,695,581 A | | 12/1997 | Lacy |
| 6,521,071 B2 | * | 2/2003 | Parrish et al. ............... 156/127 |
| 6,554,547 B1 | | 4/2003 | Collins |

OTHER PUBLICATIONS

Bandag Equipment Tools & Supplies catalog, Bandag Incorporated, 1998, pp. 19–28.

* cited by examiner

*Primary Examiner*—Lee D. Wilson
*Assistant Examiner*—David B. Thomas
(74) *Attorney, Agent, or Firm*—Leydig, Voit & Mayer, Ltd.

(57) ABSTRACT

A tire buffer for buffing a tire casing as part of a retread operation can include a rasp pedestal having a rasp head and a texturing device. A moving assembly can be connected to the rasp pedestal for selectively moving the rasp pedestal along a pair of perpendicular axes. The rasp pedestal can rotate about a vertical axis. A tire hub assembly can be included for rotating the tire casing. The tire buffer can be operated at an operator station by interfacing with a control unit. The tire buffer can automatically buff a tire casing to achieve a predetermined tire casing profile and impart a texture thereto. The tire buffer includes a tire location mechanism and a tire measurement mechanism mounted to the rasp pedestal. The control unit can monitor an operating parameter of the rasp pedestal or the tire hub assembly during the buffing sequence, compare the actual value of the operating parameter to a predetermined target value of the parameter, and adjust an operating characteristic of the rasp pedestal, the tire hub assembly, or both such that the actual value of the operating parameter is urged toward the calculated target value of the operating parameter.

30 Claims, 29 Drawing Sheets

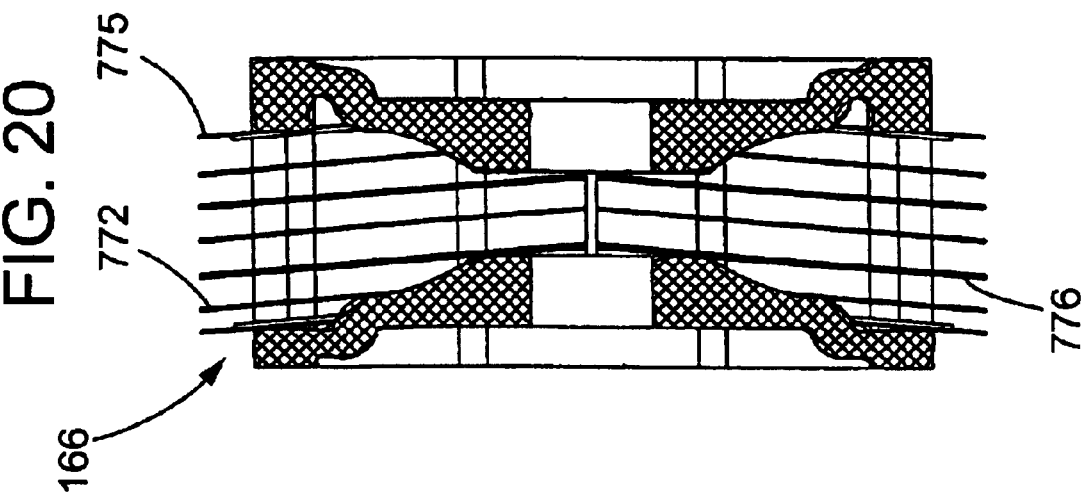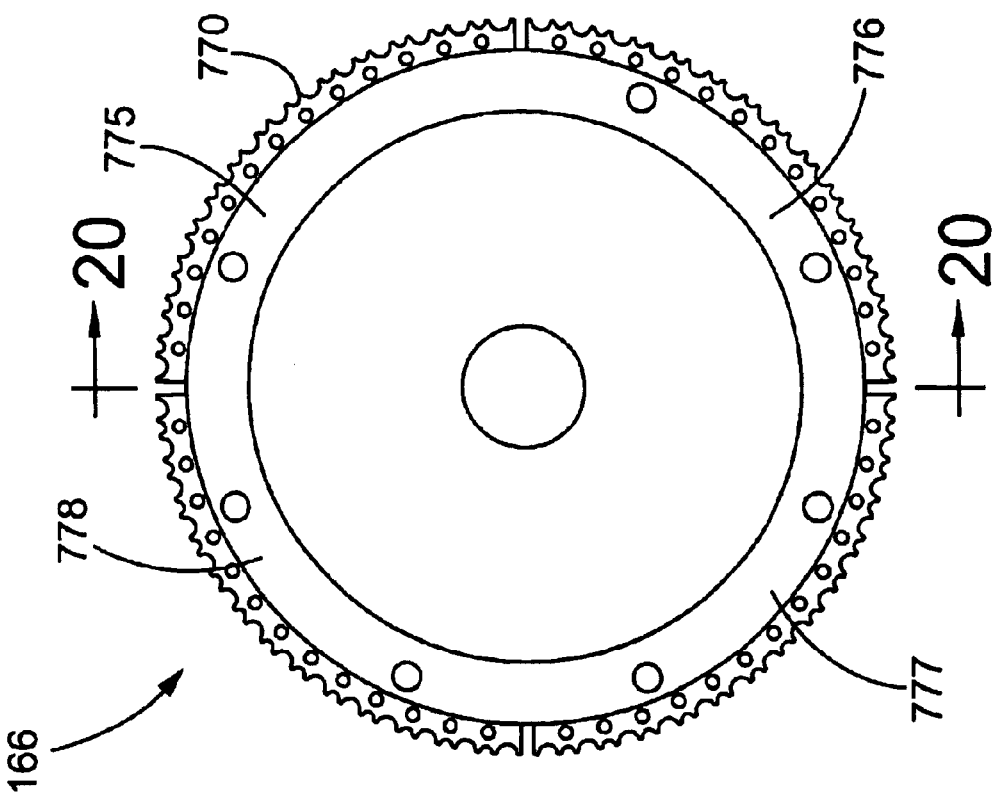

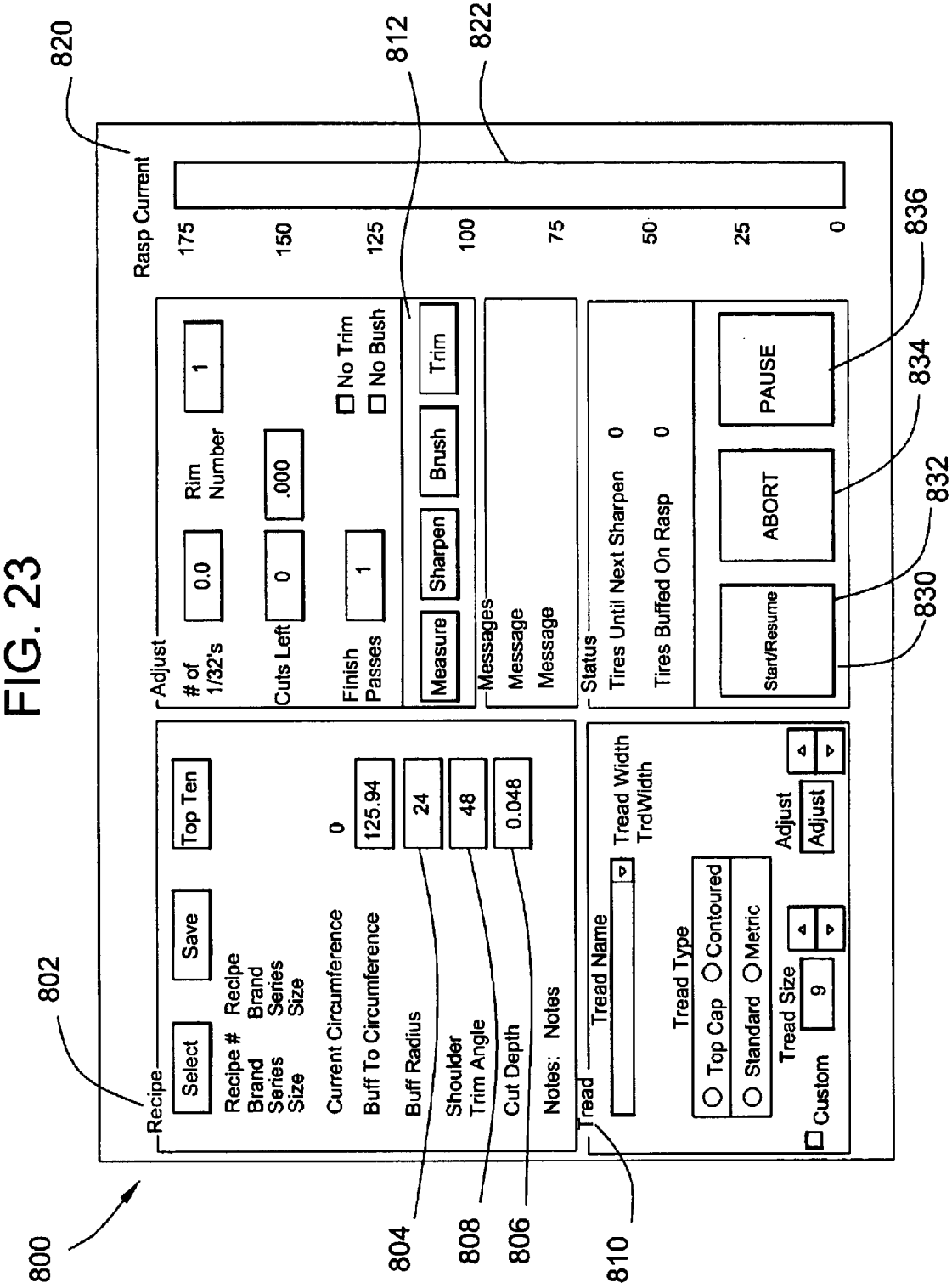

TIRE BUFFING APPARATUS

FIELD OF THE INVENTION

The present invention relates generally to devices and methods for retreading tires, and more particularly to devices and methods for buffing a tire casing to remove worn tread.

BACKGROUND OF THE INVENTION

In general, devices for removing the tread of worn tires, often called buffers or raspers, are well known. Tire buffing is part of the tire retreading operation. The method of tire retreading described herein is commonly referred to as "cold-process retreading."

Typically the tire casing selected for retreading is buffed to remove excess rubber to provide a substantially evenly-textured crown for receiving a pre-cured tread strip and to provide a predetermined tire casing profile. Tire casings usually include a belt package (a package of steel belts or cables) underlying the road-engaging surface (e.g., the original tread) of the tire. Prior to retreading, the casing must be buffed, generally to a predetermined characteristic crown radius corresponding to the upper contour of the belt package. The casing is buffed to leave only a predetermined thickness, e.g., 3/32 of an inch, of material remaining over the top belt. The shoulder of the casing is also buffed (trimmed) to eliminate or reduce voids or patterns in the shoulder created by the original tread, and to provide, typically, a relatively straight profile between the casing side walls and the crown. A worn casing from each of the various models and sizes of new tires has a characteristic tire casing profile of a particular crown width, crown buffing radius and shoulder trim angle which must be created as an initial step in the buffing process.

After being buffed, the tire casing may then be examined for injuries, which are skived and filled with a repair gum. After completion of the skiving process, the buffed surface may be sprayed with tire cement that provides a tacky surface for application of a suitable layer of bonding material, such as cushion gum. Conventionally, the cushion gum is a layer of uncured rubber material, which optionally includes a low temperature vulcanizing agent and accelerator. The cushion gum can be placed over the crown. In some retreading operations, the spray cement can be omitted.

Then a cured tread strip, typically of a width corresponding to the width of the crown of the casing is cut to the length corresponding to the casing circumference and is disposed over the casing crown. Alternatively, continuous replacement treads in the shape of a ring (i.e., ring treads) have also been used to retread the buffed casing. A roller pressing process, commonly referred to as stitching, is next performed on the assembly to force air from between the tread strip and casing.

After stitching the tire assembly, which comprises the tire casing, the cushion gum and the tread, the assembly can be placed within a flexible rubber envelope. An airtight seal can be created between the envelope and the bead of the tire casing. The entire envelope, with the tire assembly disposed therein, can be placed within a curing chamber and subjected to elevated pressure and temperature for a predetermined period of time. The combination of exposure to elevated pressure and temperature for a duration of time binds the cushion gum to both the tire casing and the new tire tread.

The tire buffing step of the retreading process can require the face of the casing, which receives the replacement tire tread, to be buffed to a predetermined crown radius within a relatively small tolerance. In addition, with the advent of new replacement tire tread designs, such as the contoured replacement tread disclosed in U.S. Pat. No. 5,277,727, issued Jan. 11, 1994, it can also be necessary to ensure that the shoulder radius is also buffed precisely to a predetermined arc, or radius.

In present retreading processes, it is important that the surface of the tire casing be carefully buffed about the shoulder areas of the tire to ensure that the tread layer width is approximately the same as the buffed surface of the casing. If the shoulder areas are not sufficiently buffed and trimmed, the tread edges may come loose and/or the cushion gum extending beyond the tread edges will not bond to the casing shoulder. Such problems can reduce the longevity of the retreaded tire and adversely impact the appearance of the retreaded tire.

The tire casing is buffed to remove tread material and to achieve a desired surface texture. Typically, it is desired for the crown and the shoulders of the tire casing to have different textures. The surface texture can be measured on a visual scale propounded by the Rubber Manufacturer's Association (RMA) with a numerical value between 1 and 6 with 1 being the finest and 6 being the roughest texture. Typically, it is desired for the crown of the tire casing to have a RMA number of between 3 and 4 and for the shoulder to have an RMA number of about 2. The shoulders of the tire casing typically are subjected to the largest stresses encountered by the tire during service. The finer texture on the shoulders promotes better adhesion of the tire tread to the casing at these high stresses. If the shoulders received too much texturing, crack propagation in these areas is more likely. In instances where the shoulder receives too little texturing, the bond between the tire casing and the tread is poorer.

The current state of the art in tire casing buffing allows for a multiplicity of tread removal passes, substantially in a sideways, pass after pass method. Known manual devices which require an operator to physically direct the buffing machine's removal direction and speed produce time periods between tread removal passes where the rate of tread rubber removal is less than optimum. Known automated devices in which the buffing machine's removal direction and speed is predetermined by an operator also produce time periods of less than optimum tread rubber removal.

Thus, there exists a need for a tire buffing machine which is easy to use and which improves tire buffing efficiency.

SUMMARY OF THE INVENTION

The present invention provides a tire buffing apparatus for buffing a tire casing as part of a retread operation. The tire buffer can include a rasp pedestal having a rasp head and a texturing device. A moving assembly can be connected to the rasp pedestal for selectively moving the rasp pedestal along a pair of perpendicular axes. The rasp pedestal can rotate about a vertical axis. A tire hub assembly can be included for rotating the tire casing. The tire buffer can be operated at an operator station by interfacing with a control unit. The tire buffer can automatically buff a tire casing to achieve a predetermined tire casing profile and impart a texture thereto. The tire buffer can include a tire location mechanism and a tire measurement mechanism mounted to the rasp pedestal.

The present invention can improve the overall efficiency of tread rubber removal during the buffing step of a tire retreading process. The control unit can monitor an operating parameter of the rasp pedestal or the tire hub assembly during the buffing sequence, such as the current draw of the rasp drive motor, for example, compare the actual value of the operating parameter to a predetermined target value of the parameter, and adjust an operating characteristic of the rasp pedestal, the tire hub assembly, or both, such as the traverse speed of the rasp pedestal with respect to the tire casing as it makes a pass, for example, such that the actual value of the operating parameter is urged toward the calculated target value of the operating parameter.

In one aspect of the invention, the main tread cutter of the tire buffer can be configured such that the cutter speed, i.e., the traverse speed of the cutter across the width of the tire casing, and the cutter feed, i.e., the depth of cut of the tread cutter, can both be adjustable. In one embodiment, an operator can select a feed rate for the cutter before the buffing operation begins. During the buffing cycle, the tire buffer can monitor the current draw on the motor operating the cutter and compare the actual current draw against a predetermined desired current draw. The cutter speed can be varied in response to any measured difference between the actual current draw and the predetermined current draw, with the speed increasing to increase the actual current draw and with the speed decreasing to decrease the actual current draw.

In a tire measurement operation, the rasp head can be moved toward the tire casing with the blades of the rasp being stationary and the tire casing, mounted to the tire chuck of the tire hub assembly, rotating. The rasp can be moved with respect to the tire hub assembly via the moving assembly. The rasp can be moved with respect to the tire hub assembly such that the rasp contacts the tire casing. Upon contacting the tire casing, the blades of the rasp head rotate in response to the rotation of the tire casing. A sensor can sense when the rasp blades start spinning and signal such occurrence to a control unit, thereby indicating the size of the tire casing.

The tire buffer includes an automated buffing operation. The main rasp, upon completion of the buffing step, can be positioned with respect to the tire casing to trim the shoulders thereof. The desired shoulder geometry can vary depending on the tire tread being used in the retreading process.

In another aspect of the invention, the tire buffer includes an automated shoulder texturing feature carried out by a texturing device, such as a wire brush, for example, mounted on the same spindle as the main tread cutter, the rasp head. By providing a tire buffer which has automated buffing and shoulder texturing features, the output of buffed tire casings from said machine is improved by facilitating the buffing process to deliver a more consistent texture profile across the tire casing and from tire casing to tire casing.

In the automated shoulder texturing operation, the texturing device is moved with respect to the tire casing with the texturing device being aligned with one of the shoulders. The texturing device is moved toward the tire casing with the texturing device rotating. A control unit monitors the current required to operate the texturing device to gauge the degree of contacting force between the shoulder and the texturing device. The texturing device is moved into the tire casing until the motor current reaches a predetermined level, at which point the texturing device stops moving closer to the tire casing. The texturing device is operated at this position for a predetermined amount of time to provide the desired shoulder texture. The rasp pedestal is moved with respect to the tire casing such that the texturing device is aligned with the other shoulder, and the same process is repeated for that shoulder.

The features of the present invention will become apparent to one of ordinary skill in the art upon reading the detailed description, in conjunction with the accompanying drawings, provided herein.

BRIEF DESCRIPTION OF THE DRAWINGS

FIG. 19 is a front elevational view of a rasp of the buffing assembly of FIG. 18.

FIG. 20 is cross-sectional view taken along line 20—20 in FIG. 19.

FIG. 23 is a schematic view of a touch screen display.

DETAILED DESCRIPTION OF EMBODIMENTS OF THE INVENTION

In accordance with the teachings of the present invention, there is provided a tire buffing apparatus for buffing a tire casing as part of a retread operation. The tire buffing apparatus can include a base assembly, a rasp pedestal, a moving assembly, a tire hub assembly, an operator station associated with a control unit, an electrical enclosure, and a pneumatic enclosure. The rasp pedestal can include a rasp head and a texturing device mounted to a single shaft for rotation thereabout. The rasp pedestal can rotate about a vertical axis. The moving assembly can be mounted to the base assembly and connected to the rasp pedestal for selectively moving the rasp pedestal along a pair of perpendicular horizontal X and Y axes. The tire hub assembly can be included for rotating the tire casing. The tire buffer can be operated at the operator station by interfacing with the control unit, which can be housed in the electrical enclosure. The tire buffer can include a tire location mechanism mounted to the rasp pedestal for detecting a tire casing mounted to the tire hub assembly when the rasp pedestal is within a predetermined distance of the tire casing. A tire measurement mechanism can be mounted to the pedestal for measuring the size of the tire casing mounted to the hub assembly.

The tire buffer can automatically buff a tire casing to achieve a predetermined tire casing profile and impart a texture thereto. The control unit can be associated with a current sensor which senses the current draw of a rasp drive motor for rotating the rasp head and the texturing device. During the buffing sequence, the control unit can compare the actual current draw of the rasp drive motor to a predetermined target current draw and adjust an operating characteristic of the tire buffer, such as the traverse speed of the rasp pedestal across the width of the tire casing being buffed, in response to any difference therebetween to urge the actual current draw toward the target current draw. In other embodiments, the operating parameter monitored and/or the operating characteristic that is changed to change the monitored operating parameter can be varied.

The tire buffer can automatically impart a predetermined shoulder texture upon shoulders of the tire casing being buffed with the texturing device.

Figure 1:
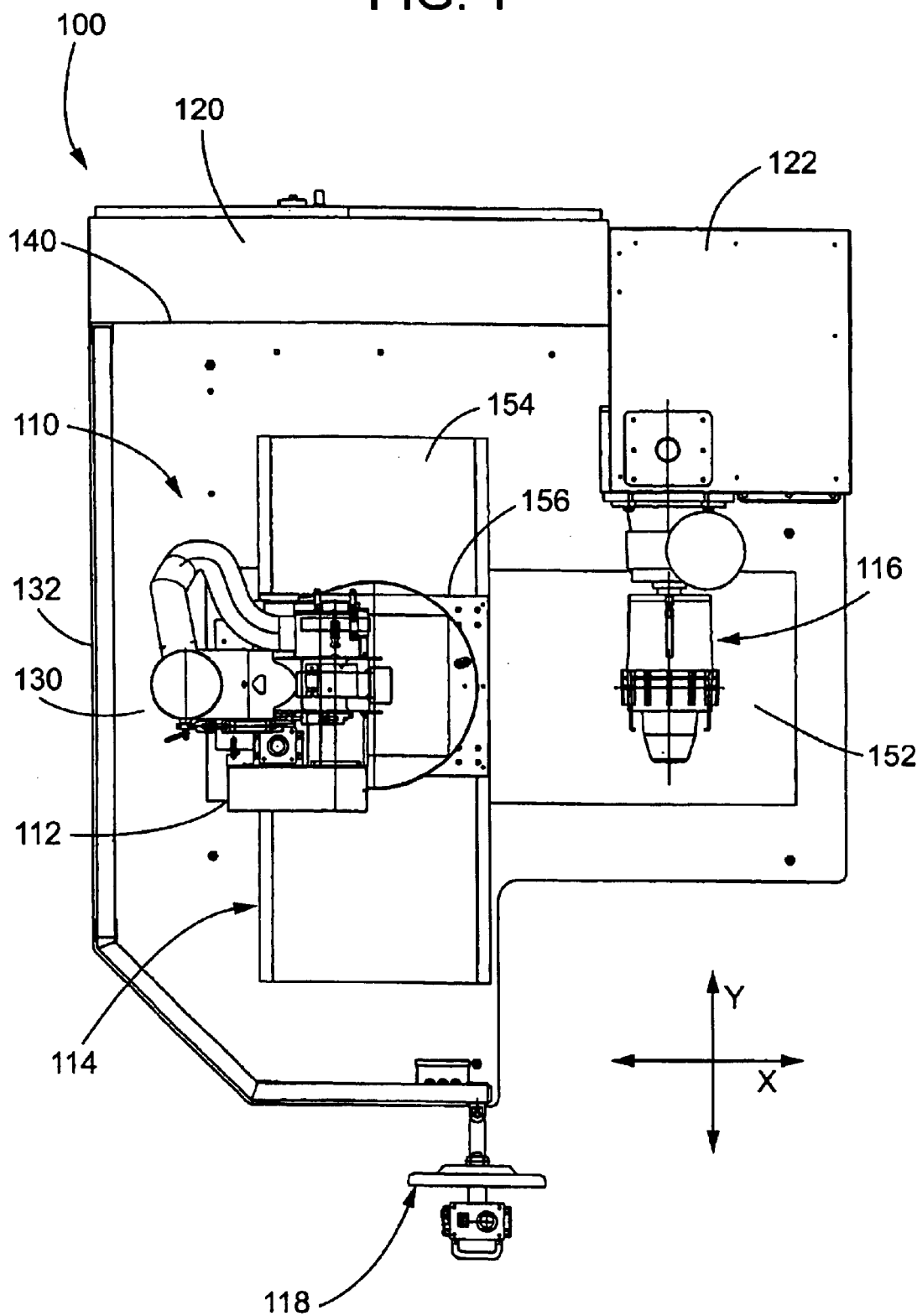
FIG. 1 is a top plan view of a tire buffer according to the present invention.

Turning now to the Figures, an illustrative tire buffing apparatus 100 is shown in FIG. 1. The tire buffer 100 can include a base assembly 110, a rasp pedestal 112, a rasp pedestal moving assembly 114, a tire hub assembly 116, an operator station 118, an electrical enclosure 120, and a pneumatic enclosure 122.

Referring to FIGS. 1–4, the base assembly I 10 includes a bottom base plate 130 and a length of fencing 132. The base plate 130 can act to support the other components of the tire buffer. The fencing 132 extends from the base plate 130 about a portion of the perimeter of the plate. The fencing 132 can act as a partition to prevent objects from unintentionally coming within the area of the tire buffer.

The rasp pedestal moving assembly 114 can be provided to selectively move the rasp pedestal 112 with respect to the tire hub assembly 116. A control unit 140 housed in the electrical enclosure 120 can control the movements of the moving assembly. The moving assembly 114 is disposed intermediate of the base plate 130 and the rasp pedestal 112.

The rasp pedestal moving assembly 114 can include a runner member 152, an X table 154, and a Y table 156. The runner member 152 can be secured to the base plate 130. The X table 154 is movably mounted to the runner member 152 such that the X table is movable along an X-axis. The Y table 156 is movably mounted to the X table 154 such that the Y table 156 is movable along a Y-axis, which is perpendicular to the X-axis.

The rasp pedestal 112 can be provided for removing tire material from a tire casing mounted to the tire hub assembly 116 to provide a predetermined, buffed tire casing profile having a desired texture. The rasp pedestal 112 can be movably mounted to the base plate 130 via the rasp pedestal moving assembly 114. The rasp pedestal 112 is rotatably mounted to the Y table 156 such that the rasp pedestal 112 is rotatable about a vertical Z-axis, which is mutually perpendicular to the horizontal X-axis and the Y-axis.

The rasp pedestal 112 is movable along the X-axis and the Y-axis and rotatable about the Z-axis to follow a predetermined buffing path which can vary depending on the make and size of the tire casing to be buffed. The rasp pedestal 112 can move along the predetermined the buffing path to define a desired, predetermined tire casing profile. The control unit 140 can control the rasp pedestal 112 through the moving assembly 114 to move along a selected buffing path depending upon the type of tire casing to be buffed, which information a user of the tire buffer 100 can input to the control unit 140 via the operator station 118.

Figure 4:
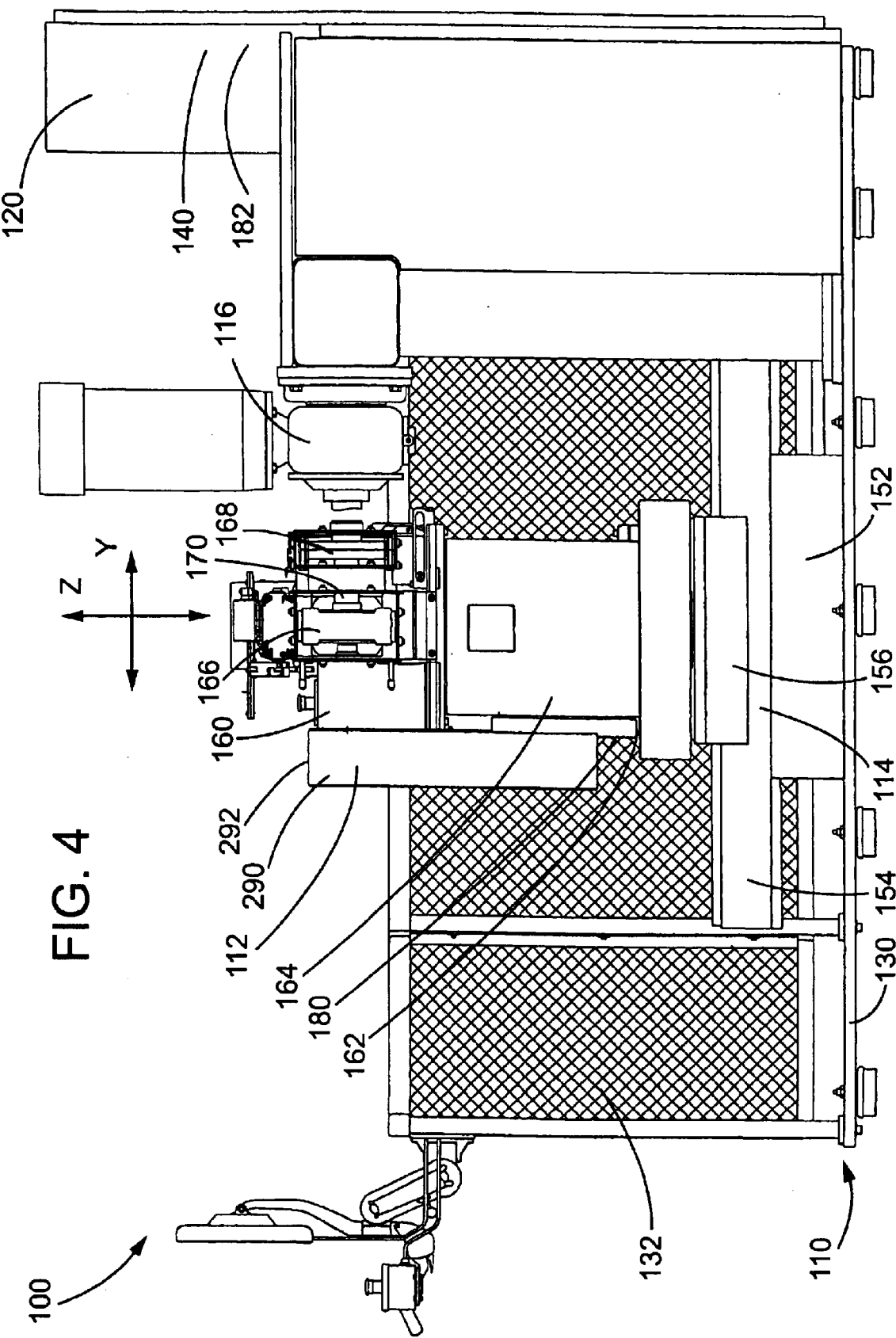
FIG. 4 is a side elevational view of the tire buffer of FIG. 1 as in FIG. 3, with a tire chuck removed for illustrative purposes.

Referring to FIG. 4, the rasp pedestal 112 can include a rasp head assembly 160, a drive motor assembly 162, and a pedestal cover 164. The rasp head assembly 160 can include a rasp head 166 for removing material from the tire casing to be buffed and a texturing device 168 for imparting a desired texture upon at least a portion of the tire casing. The texturing device 168 can be in the form of a wire brush. The rasp head 166 and the wire brush 168 can be rotatably mounted within upon a rasp shaft 170. The rasp head 166 and the wire brush 168 can be disposed within a respective housing of the assembly 160 such that they are aligned with a respective opening therein to allow the rasp head 166 and the wire brush 168 to be engageable with a tire casing mounted to the tire hub assembly 116.

The motor assembly 162 is provided to selectively drive the rasp head assembly 160. The drive motor assembly 162 includes a rasp drive motor 180 operatively connected to the rasp head assembly 160 via a belt which is in operative engagement with the rasp shaft 170 and the motor 180. The drive motor 180 can comprise a 25 Hp AC electric motor, for example. The drive motor 180 can be selectively operated by the control unit 140 to selectively operate the rasp head 166 and the texturing device 168 during the buffing sequence. A current sensor 182 can be associated with the drive motor and the control unit 140 such that the current sensor can convey to the control unit 140 the current draw of the drive motor 180 during operation of the tire buffer 100.

Figure 2:
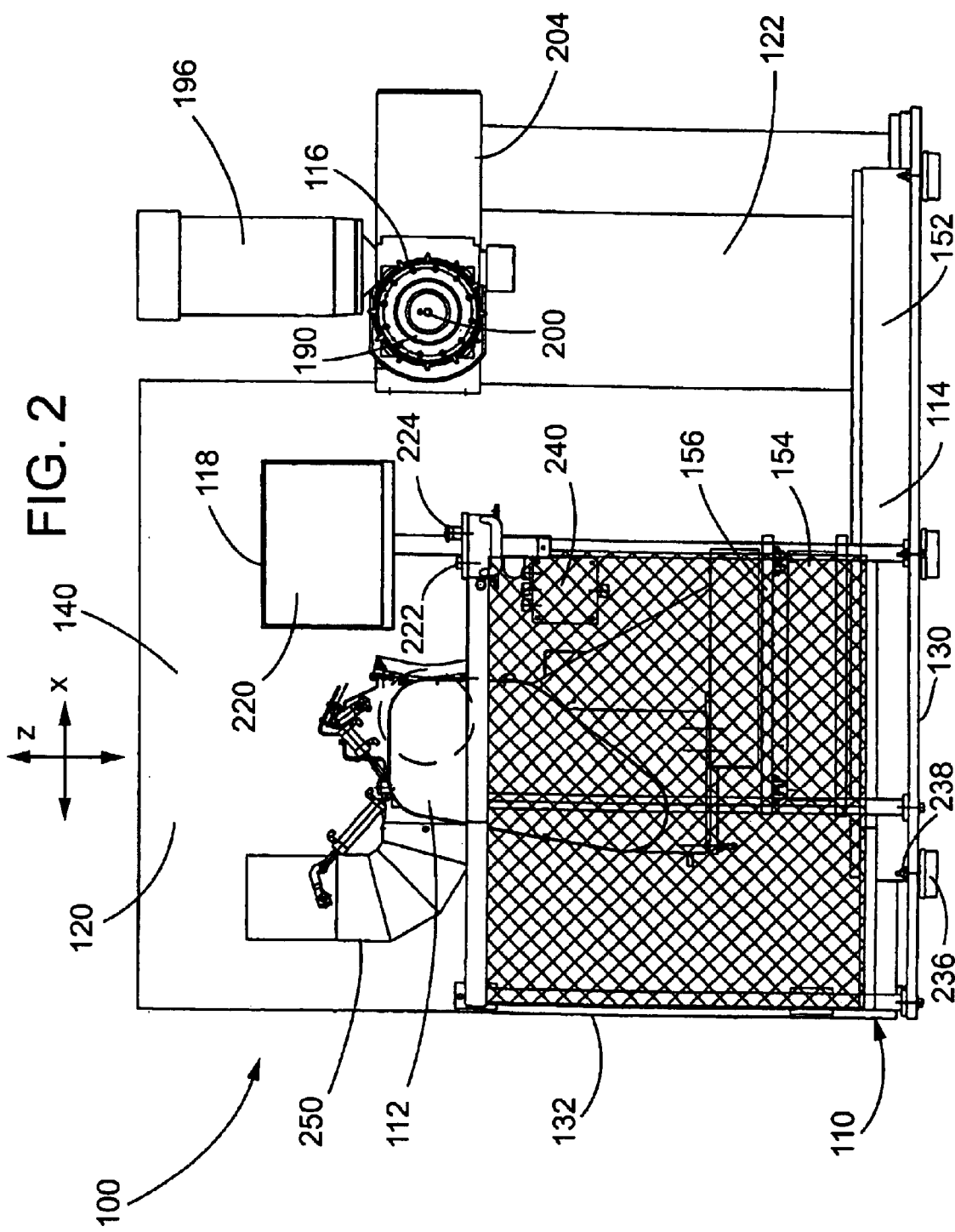
FIG. 2 is a front elevational view of the tire buffer of FIG. 1.
Figure 3:
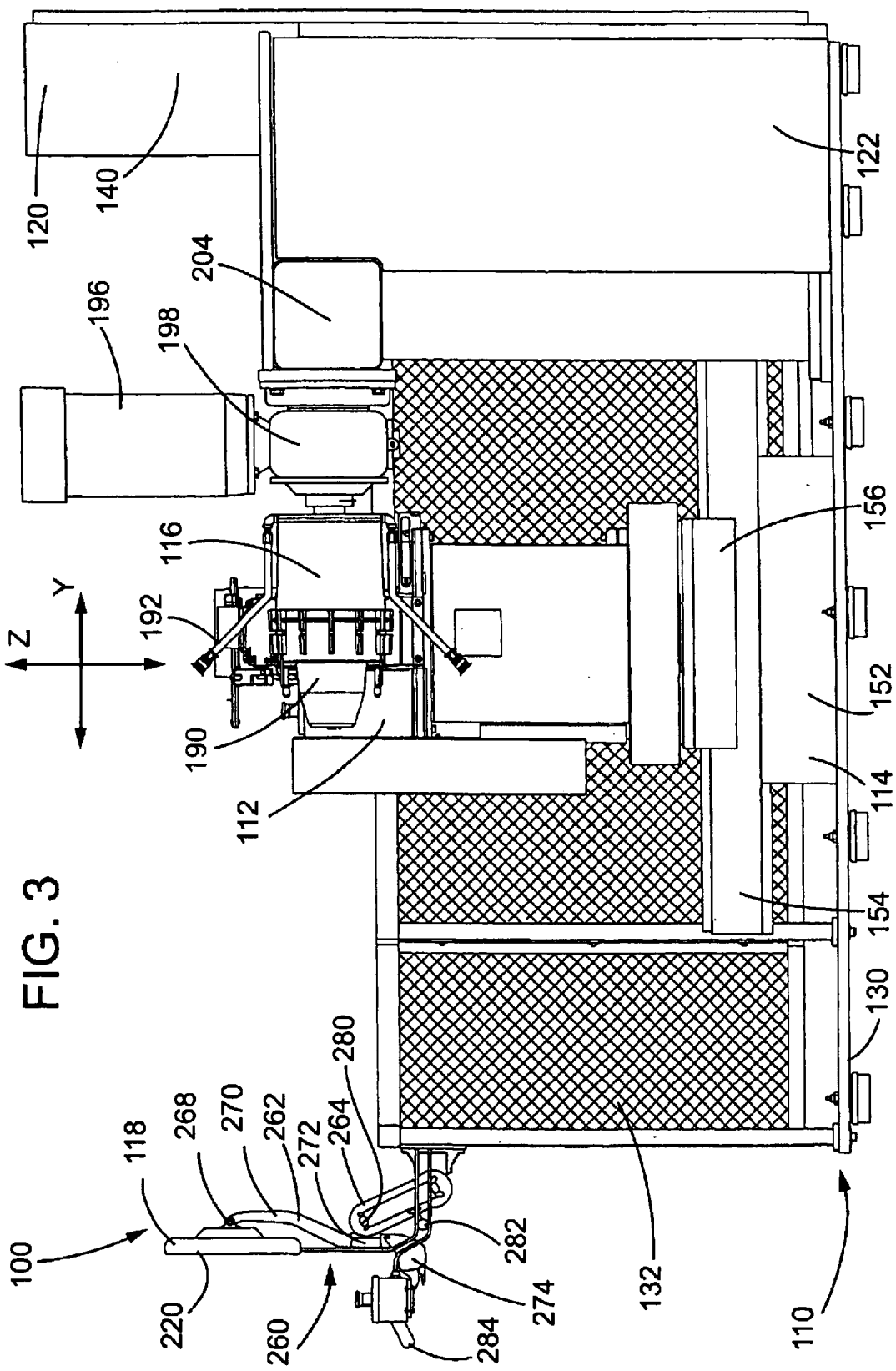
FIG. 3 is a side elevational view of the tire buffer of FIG. 1.

Referring to FIGS. 2 and 3, for supporting and rotating a tire casing during the buffing sequence, the tire hub assembly 116 can be provided. The tire hub assembly 116 can be mounted to the base plate 130 at a predetermined location, which is known to the control unit 140. The tire hub assembly 116 is disposed such that the rasp pedestal 112 can be moved into operable engagement with a tire casing mounted to the hub assembly 116 for performing a buffing sequence.

Figure 5:
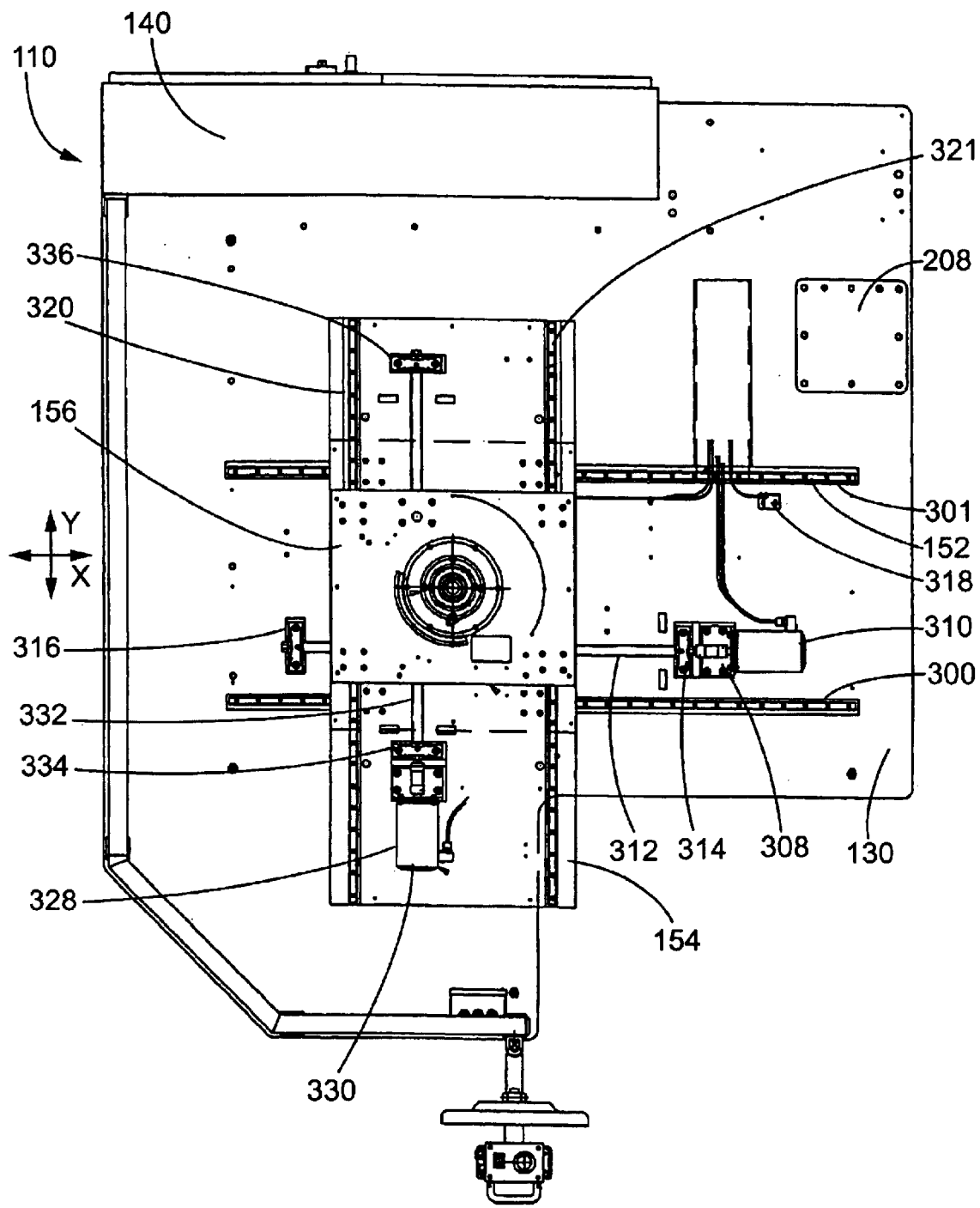
FIG. 5 is a top plan view of a base assembly and a rasp pedestal moving assembly of the tire buffer of FIG. 1.

The hub assembly 116 can include a tire chuck 190 for mounting a tire casing thereto, an inflation system 192 for inflating a tire casing mounted to the tire chuck 190, an expanding rim mounted to the chuck 190 for accepting tire casings of variable sizes, and a tire drive motor 196 and a gear box 198 for rotating the chuck 190 about a hub axis 200. The hub assembly 116 can be supported by a column assembly 204 with the gear box 198 extending from the column assembly and with the motor 196 and the chuck 190 extending from the gear box 198. The column assembly 204 can extend from a column mounting pad 208, as shown in FIG. 5. The tire drive motor 196 can be a 5 Hp AC electric motor, for example. The control unit 140 can selectively operate the tire drive motor 196 to rotate a tire casing mounted to the tire chuck 190.

For convenient operation of the tire buffer 100, the operator station 118 can be provided. The operator station 118 extends from the fencing 132 and is positioned to allow for convenient observation of the rasp pedestal 112 and the hub assembly 116. The operator station 118 includes a touch screen 220 which can receive and display information concerning the characteristics and parameters related to the tire casing to be buffed and operating parameters and characteristics of the tire buffer 100. The operator station 118 can include a power switch 222 and an emergency-stop switch 224. A user can operate the tire buffer 100 from the operator station 118 via the touch screen 220 to buff tire casings of different sizes and types. The touch screen 220 can act as an interface between the user and the control unit 140 housed in the electrical enclosure 120 for controlling the operation of the tire buffer 100.

The electrical enclosure 120 is mounted to the base plate 130 and is disposed at a rear end 230 of the tire buffer 100. The electrical enclosure 120 houses the control unit 140, the rasp drive motor current sensor 182, other suitable controls, fuses, relays, and other components associated with the electrical requirements for operating the tire buffer 100. The pneumatic enclosure 122 is mounted to the base plate 130 and is disposed adjacent the electrical enclosure 120. The pneumatic enclosure 122 houses a pneumatic system for operating various components of the tire buffer.

Referring to FIG. 2, the base assembly 110 includes a plurality of leveling pads 236 mounted to the base plate 130 by a corresponding plurality of leveling pad connectors 238. The leveling pads 236 can be adjusted via the connectors 238 to selectively move either away from or toward the base plate 130 for leveling the base plate 130.

Below the touch screen 220 at the operator station 118, the power switch 222 is provided for controlling the operation of the tire buffer 100. The emergency stop 224 switch is also provided for immediately stopping the operation of the tire buffer 100. An electrical junction box 240 can be provided for housing various components of the operator station 118.

Ductwork 250 can be mounted to the rasp pedestal 112 for connecting the rasp pedestal to an appropriate dust collection system. The dust collection system can be used to neatly convey material removed from a tire casing during the buffing operation.

Referring to FIG. 3, the operator station 118 can include a mounting assembly 260 for supporting the touch screen 220. The touch screen 220 is pivotally mounted to the mounting assembly 260. The mounting assembly 260 can include a pivot mechanism 262 and a lift mechanism 264. The pivot mechanism 262 can allow the touch screen 220 to rotate about two perpendicular axes, a horizontal axis 268 and the vertical Z axis. The lift mechanism 264 is operable to selectively move the touch screen 220 along the vertical Z axis. The lift mechanism 264 extends between the pivot mechanism 262 and the fencing 132.

The pivot mechanism 262 can include an arm 270, a collar 272, and a bracket 274. The touch screen 220 is pivotally mounted to the arm 270 at a distal end thereof such that the touch screen 220 can pivot about the horizontal axis 268. A proximal end of the arm 270 is mounted to the bracket 274 with the arm 270 extending through the collar 272. The arm 270 is rotatable with respect to the collar 272 to allow the touch screen 220 to pivot about the vertical Z axis.

The lift mechanism 264 includes a releasable ratchet mechanism 280 which allows for selective, incremental movement of the touch screen 220 along the vertical Z axis. The ratchet mechanism 280 can be activated to prevent the touch screen 220 from moving downward but allow the upward movement thereof and can be disengaged to allow for both upward and downward movement thereof. A knob 282 is associated with the ratchet mechanism 280 for selective engagement thereof. The knob 282 is biased, by a spring, for example, toward a fixed position wherein the ratchet 280 is activated. The knob 282 can be moved to a released position wherein the latching ratchet 280 is disengaged to allow the touch screen 220 to be lowered as desired. A grab handle 284 can be provided to facilitate the adjustment of the touch screen 220.

Referring to FIG. 4, the tire buffer 100 is shown with the tire chuck removed for illustrative purposes. The belt of the rasp drive motor assembly 162 can be housed within a belt guard 290. The rasp head assembly 160 is disposed at a top end 292 of the rasp pedestal 112. The belt guard 290 extends between the rasp drive motor 180 and the rasp head assembly 160.

Referring to FIG. 5, the base assembly 110 of the tire buffer is shown. The runner member 152 includes a pair of X rails 300, 301 in predetermined, spaced relationship to each other. The X table 154 can be slidably mounted to the X rails 300, 301 of the runner member. The X rails 300, 301 are in substantially parallel relationship to each other and extend longitudinally along the X axis. The X table 154 includes a plurality of bearing blocks, a pair of bearing blocks for each X rail in this embodiment, disposed on its underside which are arranged to ride upon the X rails 300, 301.

An X actuator 308 can be provided to allow the X table 154 to be movable with respect to the runner member 152, which is fixed with respect to the base plate 130. The X actuator 308 is disposed between the X rails 300, 301 and is mounted to the base plate 130. The X actuator 308 includes a servomotor 310 operably connected to a ball screw 312 via a coupling device 314. A bearing 316 can be provided to support the ball screw 312. A ball nut is disposed on the ball screw 312 and mounted to the X table 154 for allowing the X table to move along the X rails 300, 301 upon actuation of the X actuator 308. A plurality of X proximity sensors 318 is disposed in respective predetermined locations along the X axis to designate first and second X limit positions, which delineate the range of travel of the X table along the X axis, and an X home position. The X proximity sensors 318 are electrically connected to the control unit 140. The X table 154 can include a flag portion that is disposed on the table such that it can be operatively arranged with the X proximity sensors 3 18 to trip the sensors upon the flag portion being moved within a predetermined distance thereof. The X table 154 and base plate 130 can include mechanical stops which provide a supplemental system for ensuring that the X table 154 does not travel beyond a predetermined range of travel over the X axis.

The Y table 156 can be slidably mounted to a pair of Y rails 320, 321 secured to the X table 154. The X table 154 includes a pair of Y rails 320, 321 in predetermined, spaced relationship to each other. The Y rails 320, 321 are in substantially parallel relationship to each other and extend longitudinally along the Y axis. The Y table 156 includes a plurality of bearing blocks, a pair of bearing blocks for each Y rail 300, 301, disposed on its underside which are arranged to ride upon the Y rails 156.

A Y actuator 328 can be provided to allow the Y table 156 to be movable with respect to the X table 154. The Y actuator 328 is disposed between the Y rails 320, 321 and is mounted to the X table 154. The Y actuator 328 includes a servomotor 330 operably connected to a ball screw 332 via a coupling device 334. A bearing 336 can be provided to support the ball screw 332. A ball nut is disposed on the ball screw 332 and mounted to the Y table 156 for allowing the Y table 156 to move along the Y rails 320, 321 upon actuation of the Y actuator 328. A plurality of Y proximity sensors can be disposed in respective predetermined locations along the Y axis to designate first and second Y limit positions, which delineate the range of travel of the Y table 156 along the Y axis, and a Y home position. The Y table 156 can include a flag portion that is disposed on the table such that it can be operatively arranged with the Y proximity sensors to trip the sensors upon the flag portion being moved within a predetermined distance thereof. The Y proximity sensors are electrically connected to the control unit. The Y table 156 and the X table 154 can include mechanical stops which provide a supplemental system for ensuring that the Y table 156 does not travel beyond a predetermined range of travel over the Y axis.

The X and Y actuators 308, 328 can be electrically operated and driven in a conventional manner via the control unit. The X and Y home positions can be used to place the rasp pedestal in a predetermined location, a home position, at the initiation of a buffing sequence.

Figure 6:
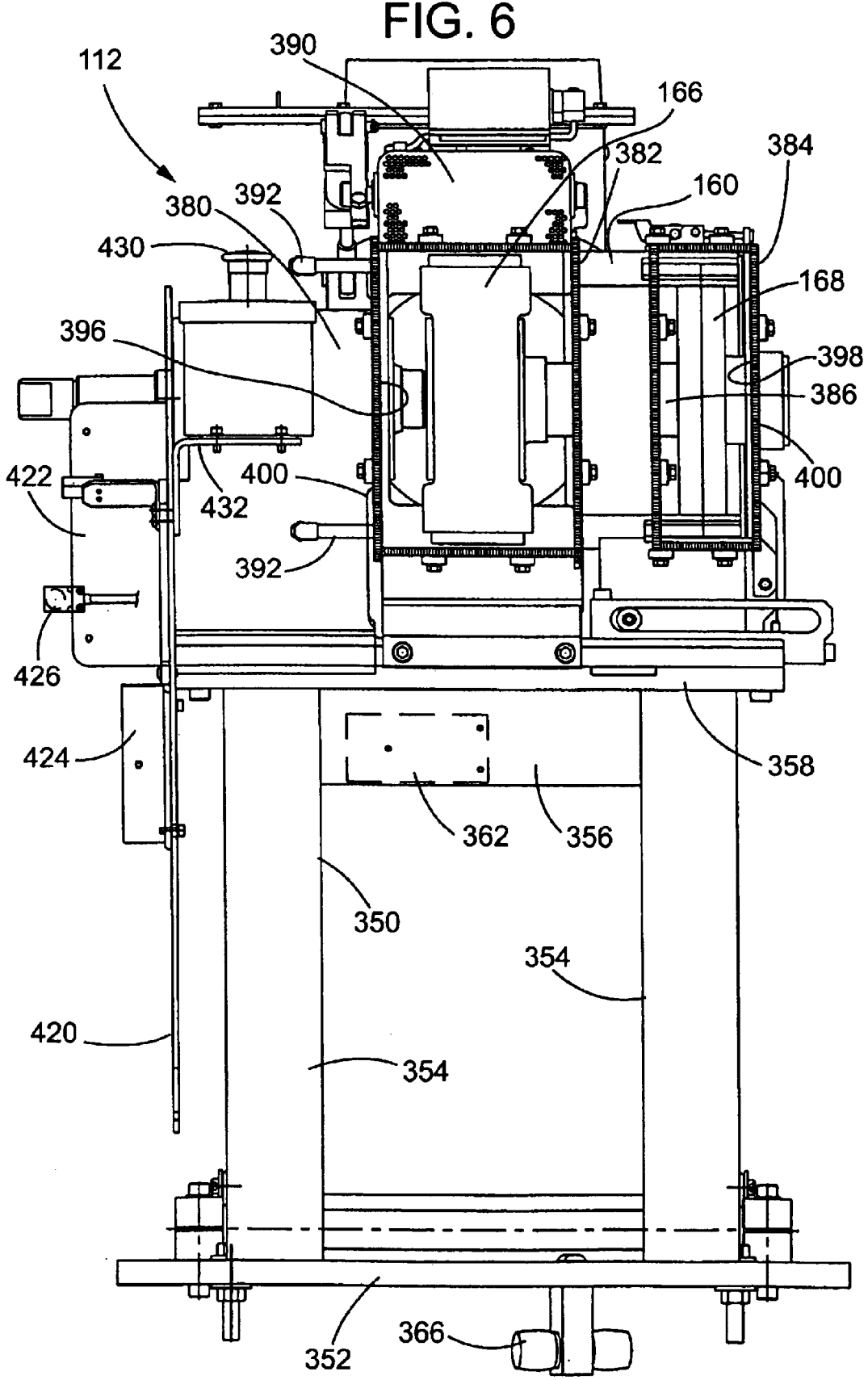
FIG. 6 is a side elevational view of a rasp pedestal of the tire buffer of FIG. 1 with a pedestal cover and a belt guard removed for illustrative purposes.
Figure 7:
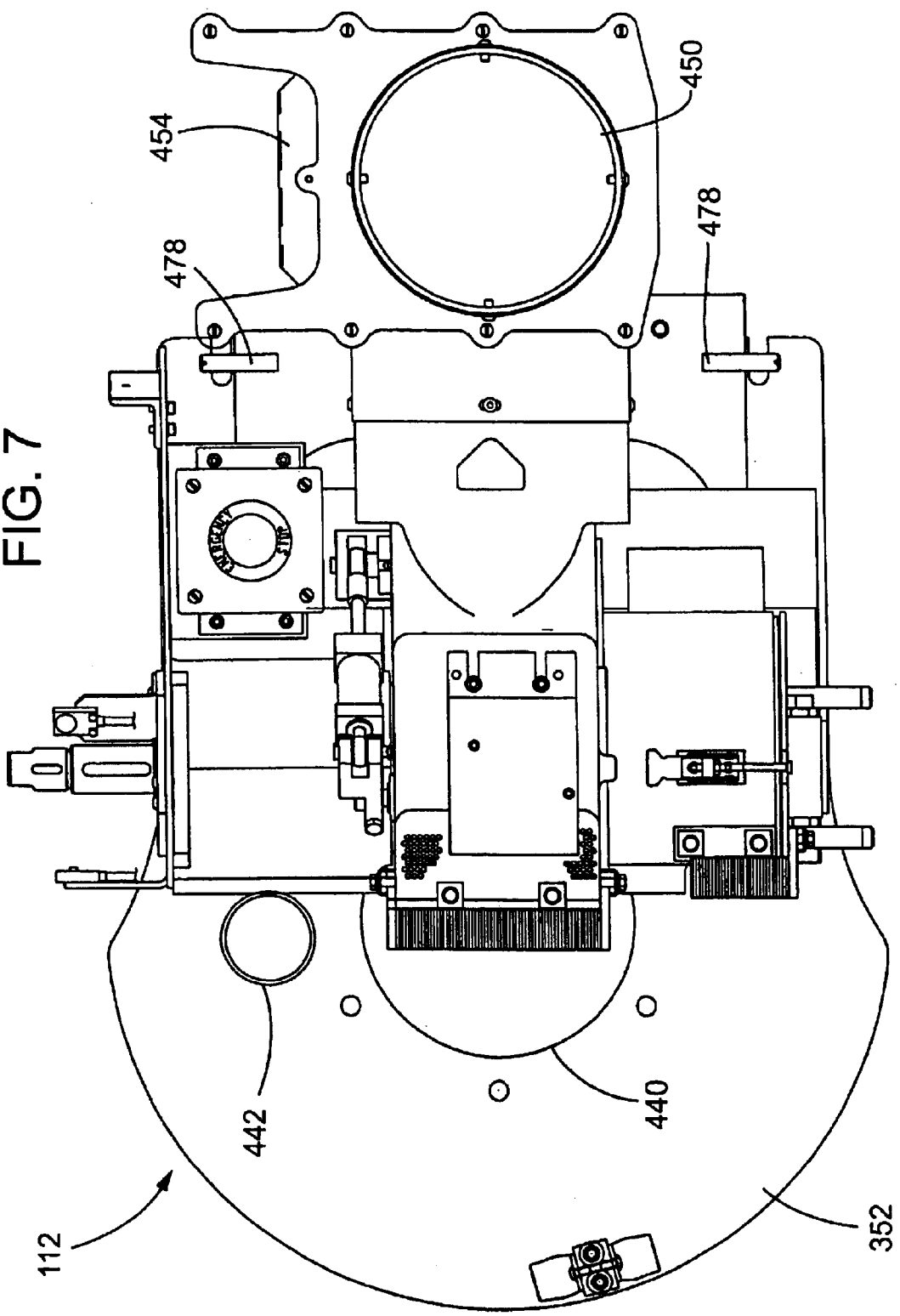
FIG. 7 is a top plan view of the rasp pedestal of FIG. 6.
Figure 8:
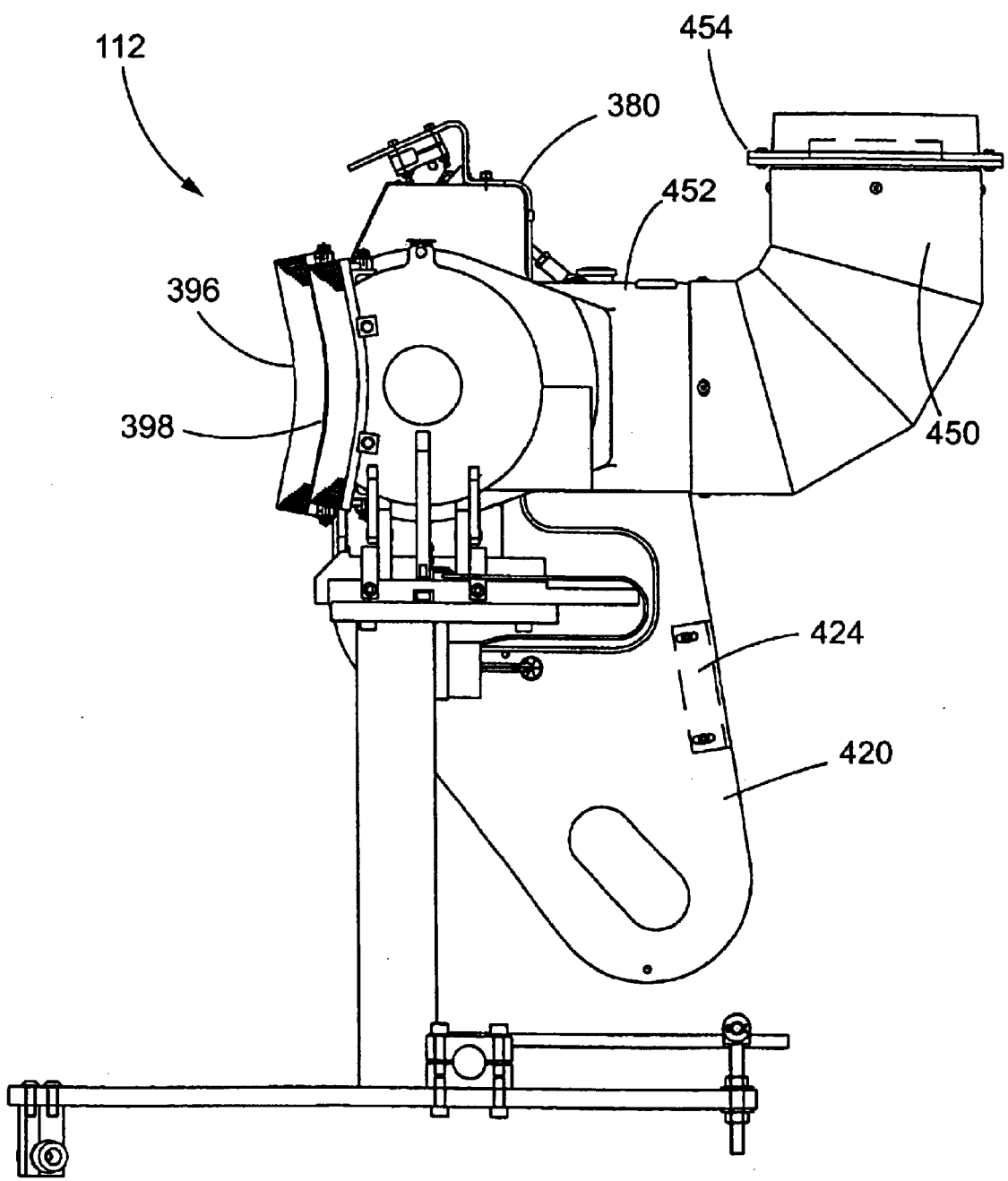
FIG. 8 is a rear elevational view of the rasp pedestal of FIG. 6.

Referring to FIGS. 6–8, the rasp pedestal 112 of the tire buffer is shown with the belt guard and the pedestal cover removed. Referring to FIG. 6, the rasp pedestal 112 includes a support assembly 350. The support assembly 350 is constructed to carry the rasp head assembly 160 and the motor assembly. The support assembly 350 includes a rasp support plate 352, a pair of support legs 354, a transverse support member 356 extending between the legs 354, and a rasp head mounting plate 358. Each support leg 354 can be a hollow square tube. The transverse support member 356 can include a junction box 362 for housing electrical components of the rasp pedestal 112. The rasp support plate 352 is suitably mounted to the Y table 156 to allow for rotational movement of the rasp pedestal 112.

A pair of bumper stops 366 extends from the rasp support plate 352. The bumper stops 366 can be arranged with stops mounted to the Y table to provide a mechanical system for delineating an arc over which the rasp pedestal 112 can rotate. The rasp pedestal 112 can also be arranged with three proximity sensors mounted to the Y table which can function to delineate limit positions of the arc of travel for the rasp pedestal 112 and a home position for the rasp pedestal 112. The support from which the bumpers 366 extend can act as a flag portion which can be operatively arranged with the proximity sensors to trip the sensors upon the flag portion being moved within a predetermined distance thereof.

The rasp head assembly 160 can house the rasp head 166 and the wire brush 168. The rasp head assembly 160 can be mounted to the rasp head mounting plate 358. The rasp head assembly 160 includes a bearing housing 380, a rasp hood 382, a brush hood 384, and a buffing assembly 386 extending therethrough. The rasp hood 382 can have a screen cover 390 which can allow air to pass therethrough while keeping the area clean. The rasp head assembly 160 can include a plurality of water supply lines 392 for spraying the interior of the rasp hood 382 to cool the rasp 166 during the buffing sequence.

The rasp hood 382 and the brush hood 384 each include a respective opening 396, 398 therein to allow the rasp 166 and the brush 168 to engage a tire casing mounted to the tire hub assembly. The openings 396, 398 are contoured, as shown in FIG. 8, to complement the circumference of a tire casing being buffed. Each opening 396, 398 has a perimeter with a bristle strip 400 projecting therefrom. The bristle strips 400 can conformingly engage a tire casing mounted to the tire hub during the buffing sequence to prevent tire casing material removed by the rasp 166 or the brush 168 from exiting the respective opening 396, 398. The bristle strips 400 can also facilitate the collection system by providing a seal with the tire casing to increase the suction power of the collection system.

Referring to FIGS. 6 and 8, a vertically-disposed belt cover plate 420 depends from the bearing housing 380 and includes mounting tabs 422, 424 for cooperative engagement with the belt guard. A belt guard proximity sensor 426 can be provided to detect whether the belt guard is mounted to the cover plate 420. Referring to FIG. 6, the rasp pedestal 112 can include an emergency-stop switch 430 for selectively terminating the operation of the tire buffer 100. The emergency stop switch 430 can be mounted to the cover plate 420 via a bracket 432.

Referring to FIG. 7, the rasp support plate 352 includes an opening 440 for a rotor assembly for selectively rotating the rasp pedestal 112 about the Z axis and a pass-through hole 442 for cable and other electrical connections.

Referring to FIGS. 7 and 8, an elbow 450 is connected to a conduit 452 extending from the rasp pedestal 112 for inclusion in the collection system. The elbow 450 can include a blast gate 454, butterfly valve, or other damper, for selective operation of the collection system. The damper 454 can be manually operated. In other embodiments, the damper can be configured to automatically move to an open position for as long as the rasp drive motor is running to allow the collection system to remove debris from the rasp pedestal 112 generated during the buffing sequence and to a closed position when the rasp drive motor is not running.

Figure 9:
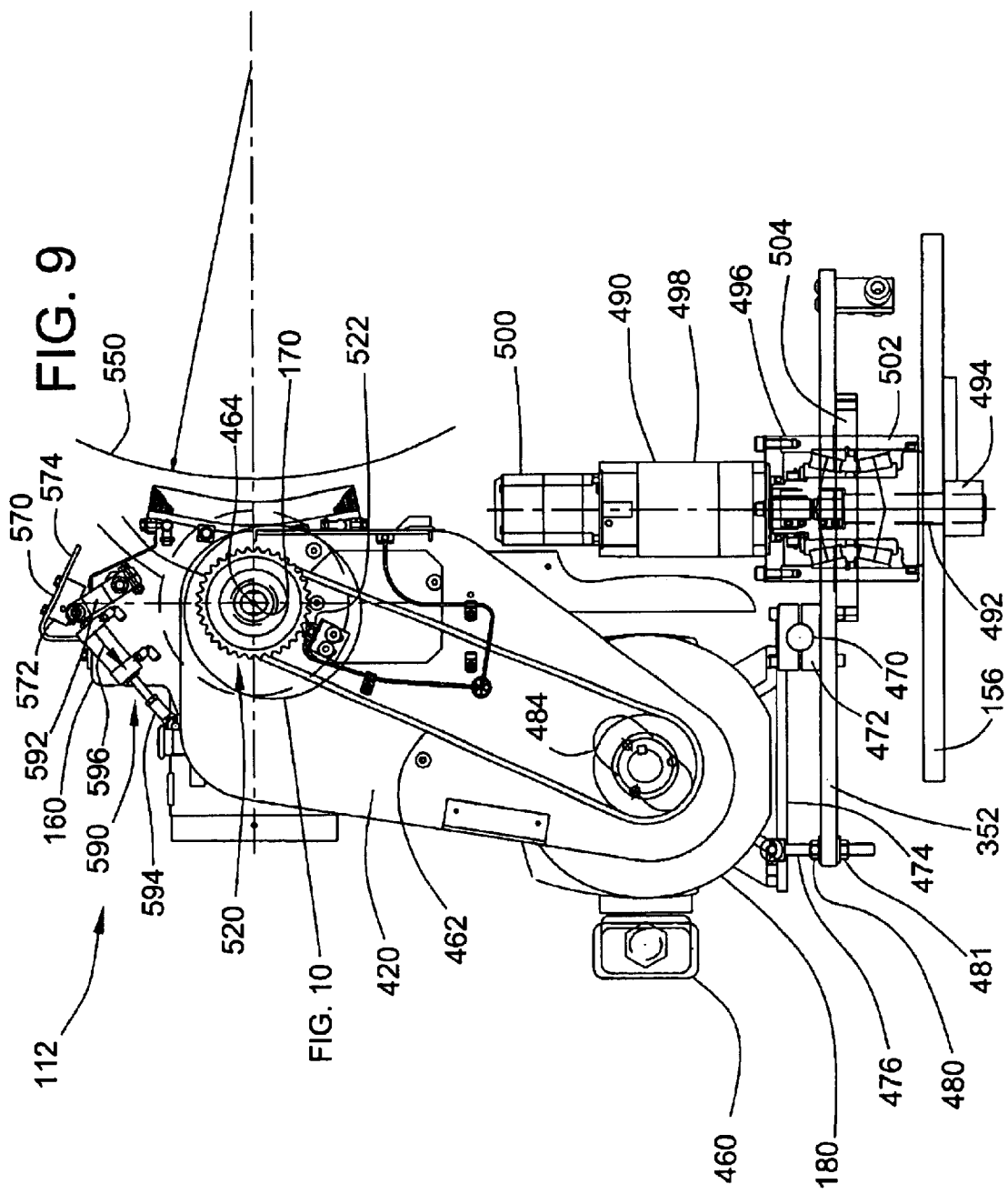
FIG. 9 is a front elevational view of the rasp pedestal of FIG. 6, partially cut away, shown with a rotator assembly mounted thereto.

Referring to FIG. 9, the rasp drive motor 180 is disposed adjacent a bottom end of the rasp pedestal 112. The rasp drive motor 180 can support a junction box 460 for housing electrical wiring connected to the motor 180 for operation thereof. The belt 462 can be operatively arranged with the motor 180 and the rasp shaft 170 to allow the motor to selectively rotate the rasp shaft about a longitudinal axis 464 of the rasp shaft. The belt 462 is disposed around a pair of pulleys respectively associated with the motor 180 and the rasp shaft 170.

The rasp drive motor 180 is pivotally mounted to the rasp support plate 352 to allow for selective adjustment of the tension of the belt 462. A pivot rod 470 is journaled between a pair of saddle brackets 472 disposed adjacent each end thereof. A mount 474 is connected to the pivot rod 470 at a first end thereof. The motor 180 is mounted to the mount 474 such that the motor 180 can rotate about the pivot rod 470. A plurality of bolts 476 extends through the mount 474 at a second end thereof with the bolts 476 extending through the rasp support plate 352. Each bolt 476 bears against a circular rod 478, also shown in FIG. 7, attached to the mount 474 for allowing the mount 474 to pivot while still providing a bearing point for the rasp drive motor 180. Each bolt 476 includes a pair of nuts 480, 481, one being disposed above the rasp support plate 352 and the other disposed below it to allow the second end of the mount 474 to be positioned in spaced relationship to the support plate 352. The position of the second end of the mount 474 can be adjusted by manipulating the nuts as desired. The motor 180 can be pivoted about the pivot rod 470 either toward or away from the rasp support plate 352 to adjust the tension placed upon the belt 462. The belt cover plate 420 includes an elongated slot 484 to accommodate movement of the rasp drive motor 180.

The rasp pedestal 112 can include a rotator assembly 490 for selective rotational movement of the rasp pedestal 112. The rotator assembly 490 can include a shaft 492 with a torque arm 494 connected thereto, a rotator bearing housing 496, a gearbox 498, and a rotator actuator 500, in the form of a servomotor in this embodiment. The shaft 492 is operatively attached to the gearbox 498. The shaft 492 extends from the gearbox 498 and through a portion of the Y table 156 with a free end of the shaft extending beyond the Y table. The torque arm 494 extends from the free end of the shaft and is in operative engagement with the Y table 156 to prevent the shaft 492 from rotating with respect to the Y table. The gearbox 498 includes a housing 502 and a stub shaft. The stub shaft of the gearbox 498 is coupled to the shaft 492. The housing 502 of the gearbox 498 can rotate with respect to the Y table 156 upon actuation of the rotator actuator 500. The gearbox housing 502 has a flange 504 extending therefrom. The flange 504 can be mounted to the rasp support plate 352 of the rasp pedestal via bolts, for example, extending through mounting holes in the flange and the rasp support plate. The rasp support plate 352 includes the opening 440, shown in FIG. 7, therein to accommodate the rotator bearing housing 496.

Figure 10:
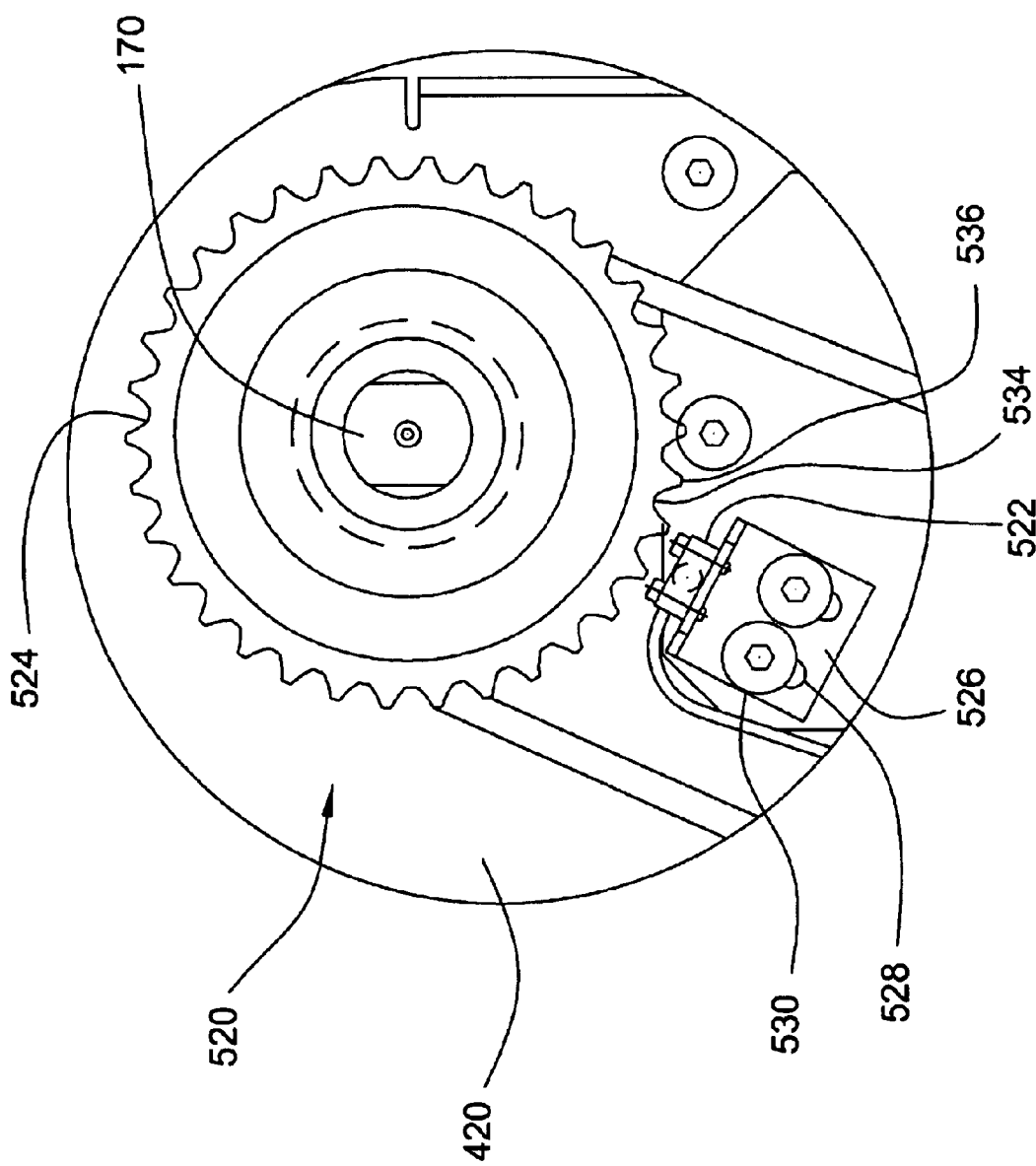
FIG. 10 is an enlarged detail view taken from FIG. 9.

Referring to FIGS. 9 and 10, the rasp pedestal 112 can include a tire measurement mechanism 520 for measuring the size of a tire casing mounted to the tire hub assembly. The tire measurement mechanism 520 can include a proximity sensor 522 and a sprocket 524. The proximity sensor 522 is disposed adjacent the sprocket 524 and operatively arranged to detect movement of the sprocket 524. The proximity sensor 522 is mounted to the belt cover plate 420 which extends from the rasp head assembly 160. The proximity sensor 522 is connected to a bracket 526 which is movably mounted to the cover plate 420. The bracket 526 includes a pair of elongated slots 528 which can accommodate a pair of bolts 530, respectively, therethrough. The bolts 530 can extend through the cover plate 420 for securing the bracket 526 thereto. The bracket 526 can move with respect to the bolts 530 and the cover plate 420 over a range of travel defined by the elongated slots 528. The position of the proximity sensor 522 can be adjusted by moving the bracket 526 to ensure that the proximity sensor 522 is positioned to detect movement of the sprocket 524.

The proximity sensor 522 is electrically connected to a power source via a line which can be secured to the cover plate 420 by a clip, as shown in FIG. 9. The proximity sensor 522 can send a signal through the line to the control unit of the tire buffer upon sensing the movement of the sprocket 524.

The sprocket 524 is mounted to the rasp shaft 170. The sprocket 524 can rotate upon the rotation of the rasp shaft 170. The proximity sensor 522 is positioned with respect to the sprocket 524 such that the proximity sensor will be deactivated when a valley 534 of the sprocket is in its sensing field and will be activated when a tooth 536 of the sprocket is in its sensing field. By changing conditions upon movement of the teeth of the sprocket, the sprocket proximity sensor 522 can signal the control unit that the sprocket 524 is moving.

To determine the size of the tire, the rasp pedestal 112 can be moved from a known, home position toward a tire casing 550 mounted to the tire hub assembly. The tire hub assembly can be located at a second, known position. The control unit can monitor the distance the rasp pedestal 112 moves from the home position. The tire hub assembly can be activated to rotate the tire casing mounted thereto. The rasp head 166 of the rasp pedestal can be aligned with the tire casing 550. Once the rasp 166 is brought into contact with the rotating tire casing 550, the rasp 166 will begin to rotate in response, which in turn causes the rasp shaft 170 and the sprocket 524 to rotate. The proximity sensor 522 can signal the control unit that the sprocket 524 is moving whereupon the control unit can direct the rasp pedestal 112 to stop moving toward the tire hub assembly. The control unit can determine the size of the tire casing 550, for example the tire casing diameter, by comparing the known position of the tire hub assembly 116 with the position of the rasp pedestal 112 at the time the sprocket 524 first began to move.

Referring to FIG. 9, the rasp pedestal 112 can include a tire location sensor mechanism 570, which can be provided to facilitate the tire measurement operation and to reduce the time require to complete the measurement operation. The tire location sensor mechanism 570 can include a tire sensor 572 and mounting member 574. The mounting member 574 is mounted to the rasp head assembly 160 and can act to support the tire sensor 572. The tire sensor 572 can be electrically connected to the control unit by way of a line. The tire sensor 572 is positioned to detect the tire casing 550 mounted to the tire hub assembly upon the rasp pedestal 112 being disposed within a predetermined distance from the tire hub assembly. The tire sensor 572 is oriented such that a photo beam that it can emit is directed toward the tire casing 550 mounted to the tire hub assembly. The rasp pedestal 112 can be moved toward the tire hub assembly at a first rate of speed until the tire casing 550 mounted to the tire hub assembly trips the tire sensor 572. The tire sensor 572 can be tripped at a point where the rasp pedestal 112 is not contacting the tire casing 550. The tire sensor 572 can send a signal to the control unit which in response slows the rasp pedestal 112 to a second rate of speed suitable for allowing the tire measurement mechanism 520 to operate. The rasp pedestal 112 can advance toward the tire casing 550 at the slower, second rate of speed to perform the tire measurement operation, stopping upon the tire measurement mechanism 520 sensing the contact of the tire casing with the rasp.

Referring to FIG. 9, the rasp pedestal 112 can include a rasp sharpening system 590 for periodically sharpening the rasp head. The rasp sharpening system 590 can include a plurality of sharpening stones disposed with the rasp head assembly, a pivotable lever arm 592 to which the stones are mounted, and a cylinder 594 for selectively pivoting the lever arm 592. Actuating the cylinder 594 can operate the sharpening system 590. The cylinder 594 can be mounted to a distal end of the lever arm 592. When the cylinder 594 is actuated, the cylinder 594 can move in an actuating direction 596 with the lever arm 592 rotating in response to bring the sharpening stones into operative engagement with the rasp head 166. The sharpening stones can act to knock off any edges present on the blades of the rasp head and to trim the blades such that they extend from the hub of the rasp a uniform distance. The sharpening system 590 can be operated automatically via the control unit after the tire buffer 100 has buffed a predetermined number of tire casings.

Figure 11:
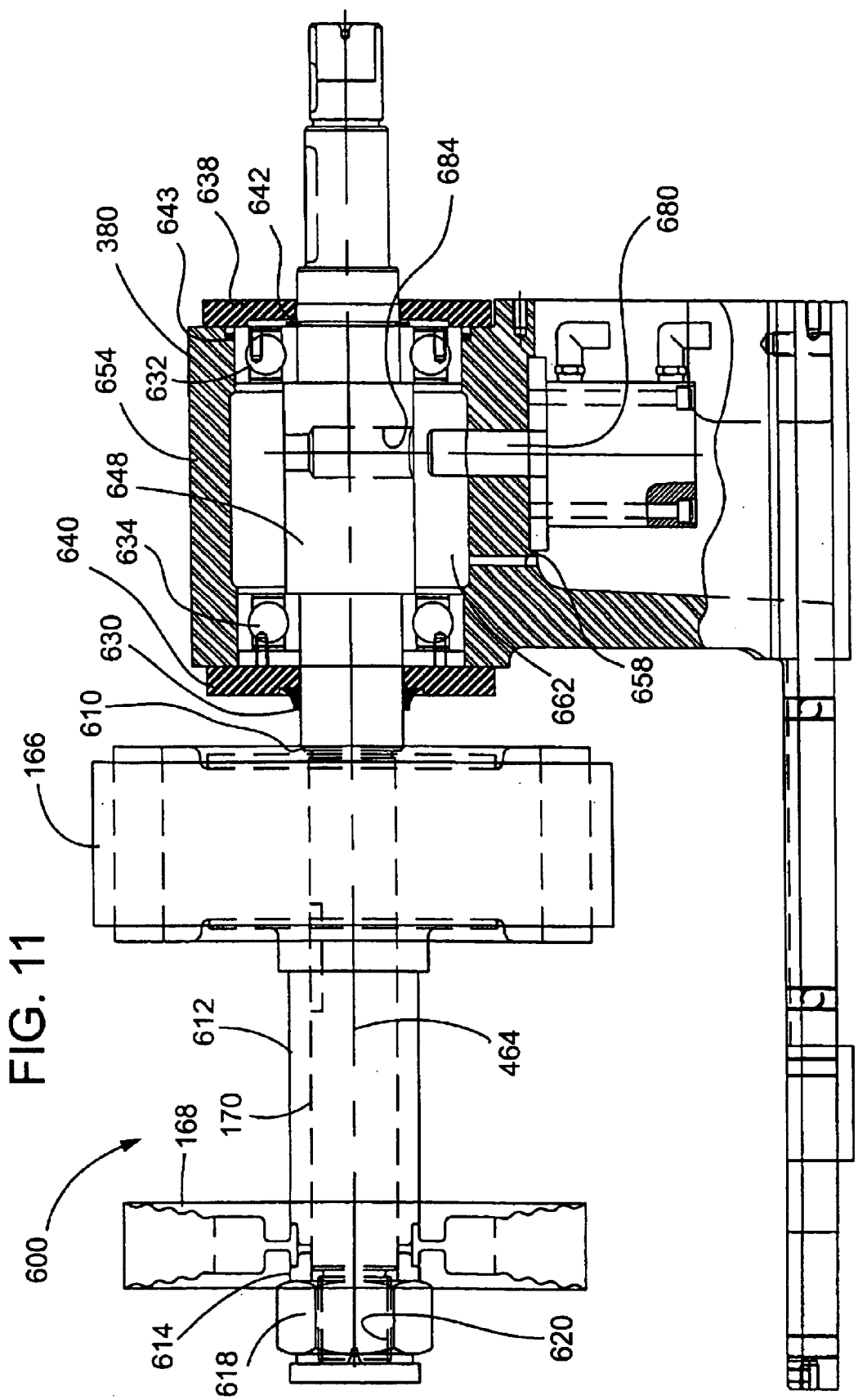
FIG. 11 is a second side elevational view, partially in section, of a buffing assembly of a rasp head assembly of the rasp pedestal of FIG. 6.
Figure 12:
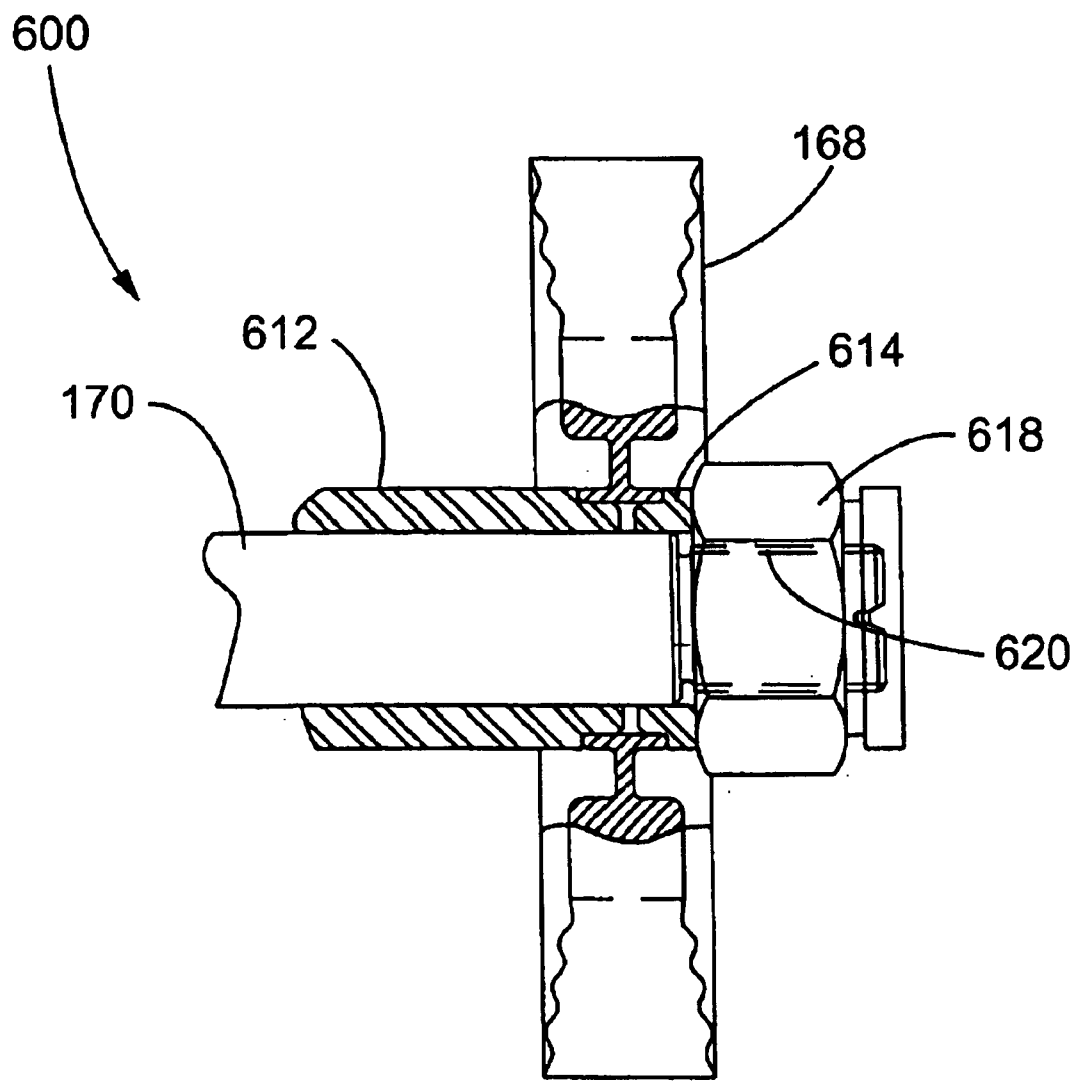
FIG. 12 is a fragmentary, first side elevational view, partially in section, of a rasp shaft and a texturing device of the buffing assembly of FIG. 11.

Referring to FIGS. 11 and 12, a buffing assembly 600 of the rasp head assembly is shown. The wire brush 168 and the rasp 166 can be mounted to the rasp shaft 170. Referring to FIG. 11, the rasp shaft 170 includes a mounting shoulder 610, against which the rasp head 166 can be abutted. A first spacer column 612 can be disposed over the rasp shaft 170 between the rasp head 166 and the wire brush 168. The spacer column 612 is generally cylindrical and configured to accommodate the rasp shaft 170. The first spacer column 612 can engage a hub portion of the rasp head 166 and a hub portion of the wire brush 168. A second spacer column 614 is provided between the wire brush 166 and a rasp nut 618. The rasp nut 618 can be threadedly secured to a threaded end 620 of the rasp shaft to capture the wire brush 168 and the rasp head 166 in predetermined arrangement such that the wire brush and the rasp head are aligned with the respective openings of the brush hood and the rasp hood. The rasp nut 618 can be threaded onto the rasp shaft 170 until the rasp nut drives the second spacer column 614, the wire brush 168, the first spacer column 612, and the rasp head 166 into contacting relation with the mounting shoulder 610 of the rasp shaft. The rasp head 166 and the wire brush 168 are in constrained relationship with the rasp shaft 170 via the rasp nut 618 and the mounting shoulder 610 with the spacer columns 612, 614 therebetveen such that the wire brush and the rasp head rotatively secured to the rasp shaft, rotating with the rasp shaft upon it being rotated by the rasp drive motor.

In other embodiments, the wire brush and the rasp head can be mounted to the rasp shaft using any suitable technique.

Referring to FIG. 11, the bearing housing 380 can help to retain the rasp shaft 170 such that the rasp shaft is constrained from moving with respect to the bearing housing 380 along the longitudinal axis 464 of the rasp shaft. The bearing housing 380 and the rasp shaft 170 can be in sealing relationship to each other with the rasp shaft free to rotate about its longitudinal axis 464. A seal 630 can be disposed around the rasp shaft 170 such that it is in contacting, sealing relation to an outer surface of the rasp bearing housing 380. The seal 630 can be made from rubber or any other suitable material. The bearing housing 380 includes a first and a second bearing portion 632, 634, with each bearing portion comprising a plurality of ball bearings disposed in a ring around the rasp shaft 170. The bearing portions 632, 634 are constrained from moving with respect to the longitudinal axis 464 of the rasp shaft by a first and a second cover plate 638, 640 of the bearing housing, a pair of snap rings 642, 643, and an intermediate collar portion 648 of the rasp shaft 170 disposed between the first and second bearing portions 632, 634. One of the snap rings 642 is disposed in a groove encircling the rasp shaft adjacent the first cover. The other snap ring 643 is disposed in a recess in a body 654 of the bearing housing. The first and second covers 638, 640 can be removable from the body 654 of the bearing housing by being removably bolted thereto.

The body 654 of the housing can include a grease port 658 which communicates with a bearing cavity 662 for supplying grease or other lubricant to the first and second bearing portions 632, 634.

The rasp bearing housing 380 can include a detent cylinder 680 which is selectively engageable with the rasp shaft 170 to prevent the rasp shaft from rotating. The detent cylinder 680 can be mounted to the body 654 of the rasp bearing housing by a plurality of bolts. The detent cylinder 680 can be inserted into a bore 684 in the rasp shaft 170 to lock the rasp shaft in place. The detent cylinder 680 can be pneumatically driven and can be operated through the user interface disposed on the touch screen. With the rasp shaft 170 locked in place the retaining nut 618 can be removed from the rasp shaft 170 to allow the wire brush 168 and the rasp head 166 to be withdrawn from the rasp shaft.

Figure 13:
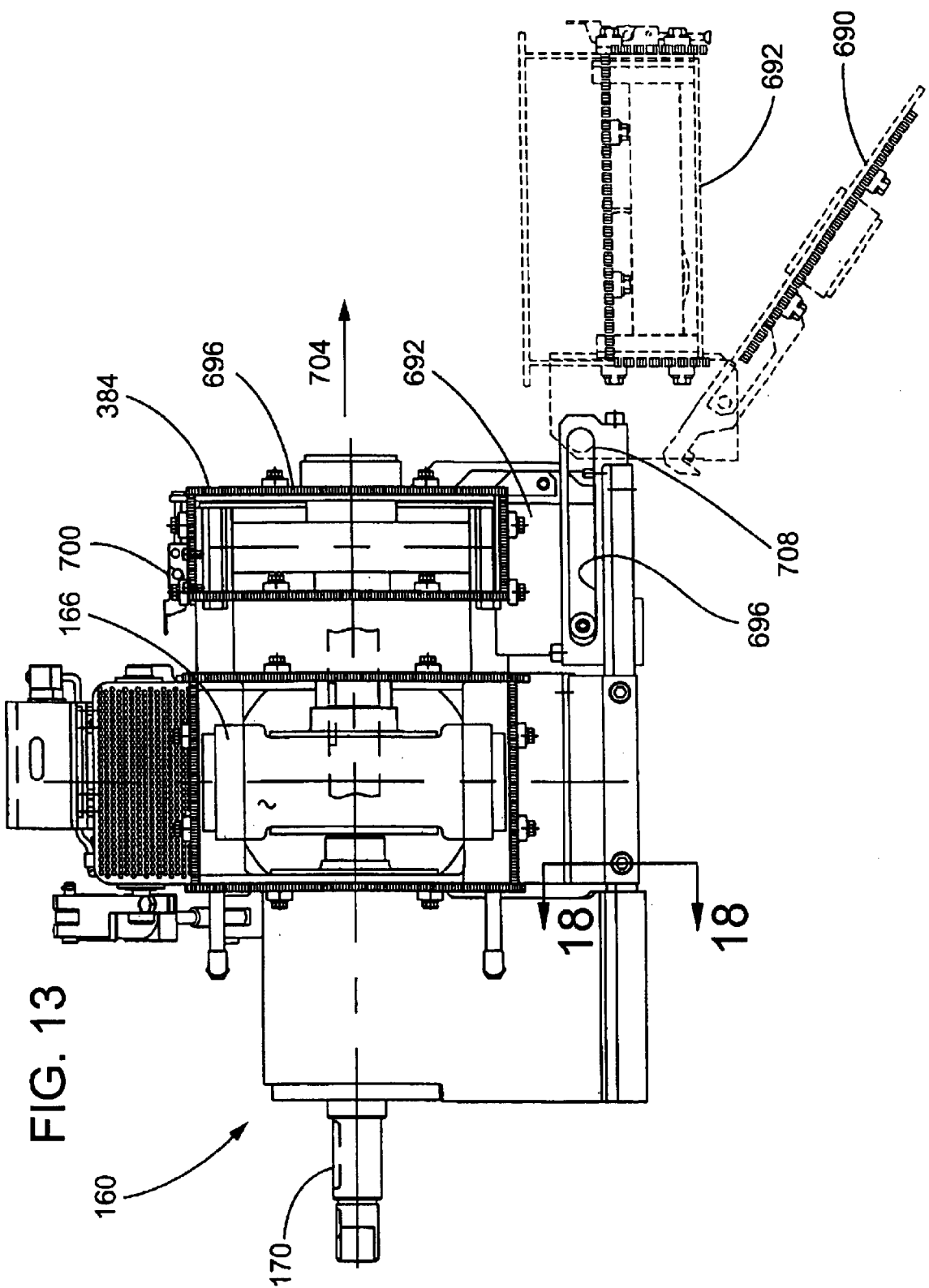
FIG. 13 is a side elevational view of the rasp head assembly of the rasp pedestal of FIG. 6.

Referring to FIGS. 13–16, the rasp head assembly 160 is shown. Referring to FIG. 13, the brush hood 384 includes a door 690 which can be disposed in a closed position and in the open position, as shown in hidden lines. The door 690 is pivotally mounted at its lower end to a carriage 692 which is captured within a slot 696. The door 690 can be held in the closed position by a latch mechanism 700. The door 690 can be moved to the open position with the carriage 692 in an upright position, as shown in full lines, to allow the nut to be removed from the rasp shaft 170. With the nut removed, the wire brush 168 can be removed from the rasp shaft 170. The carriage 692 can be translated in a removal direction 704 until it is sufficiently clear of the rasp head mounting plate 358 to permit it to rotate downward about a pivot 708. With the carriage 692 disposed in a lowered position, as shown in hidden lines in FIG. 11, the rasp 166 can be removed from the rasp shaft 170.

Figure 14:
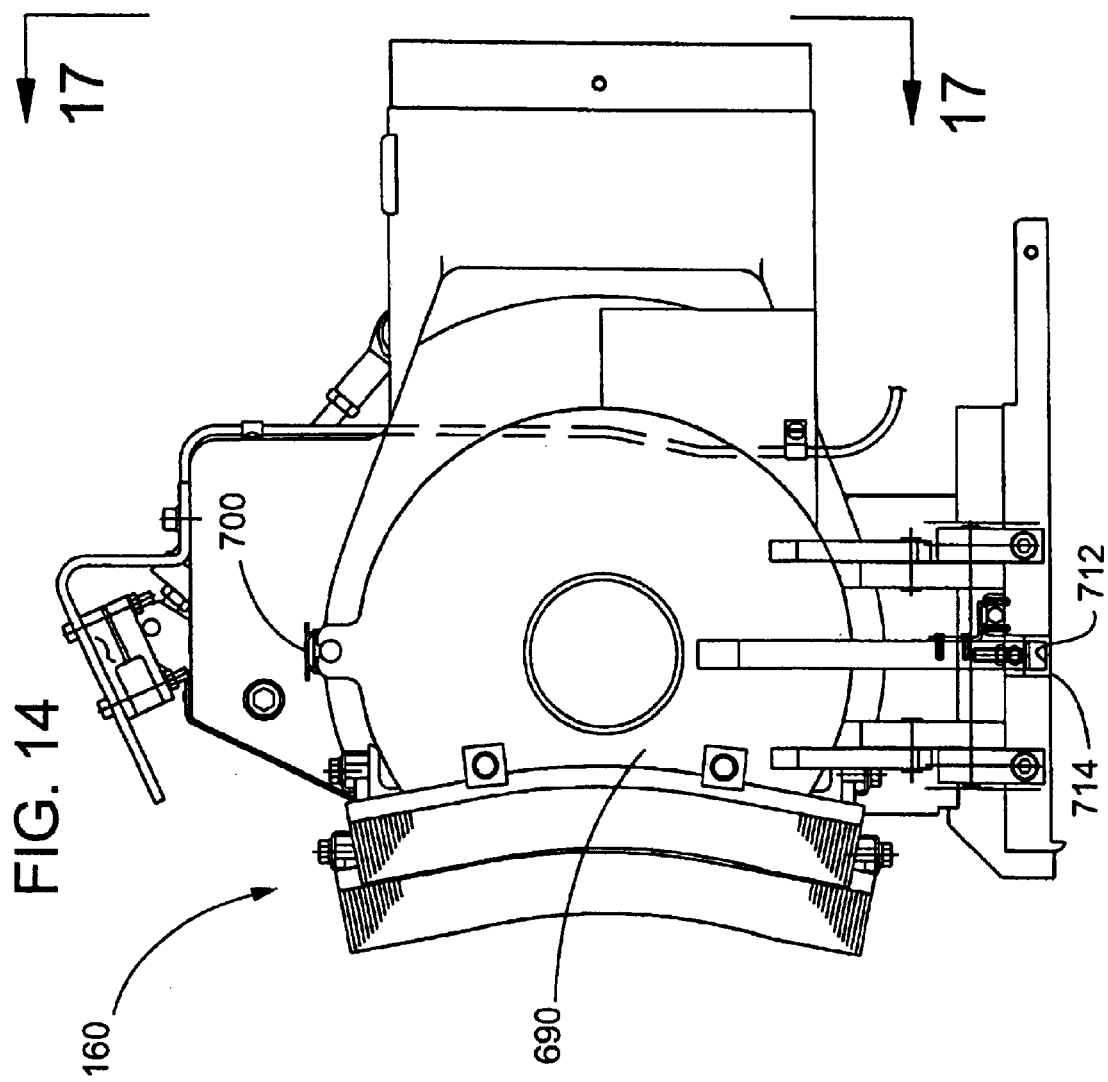
FIG. 14 is a rear elevational view of the rasp head assembly of FIG. 13.

Referring to FIG. 14, the latch mechanism 700 can also include a tab 712 which can extend through an opening 714 to help secure the door 690 in place and to provide a second locking point between the brush hood and the door.

Figure 15:
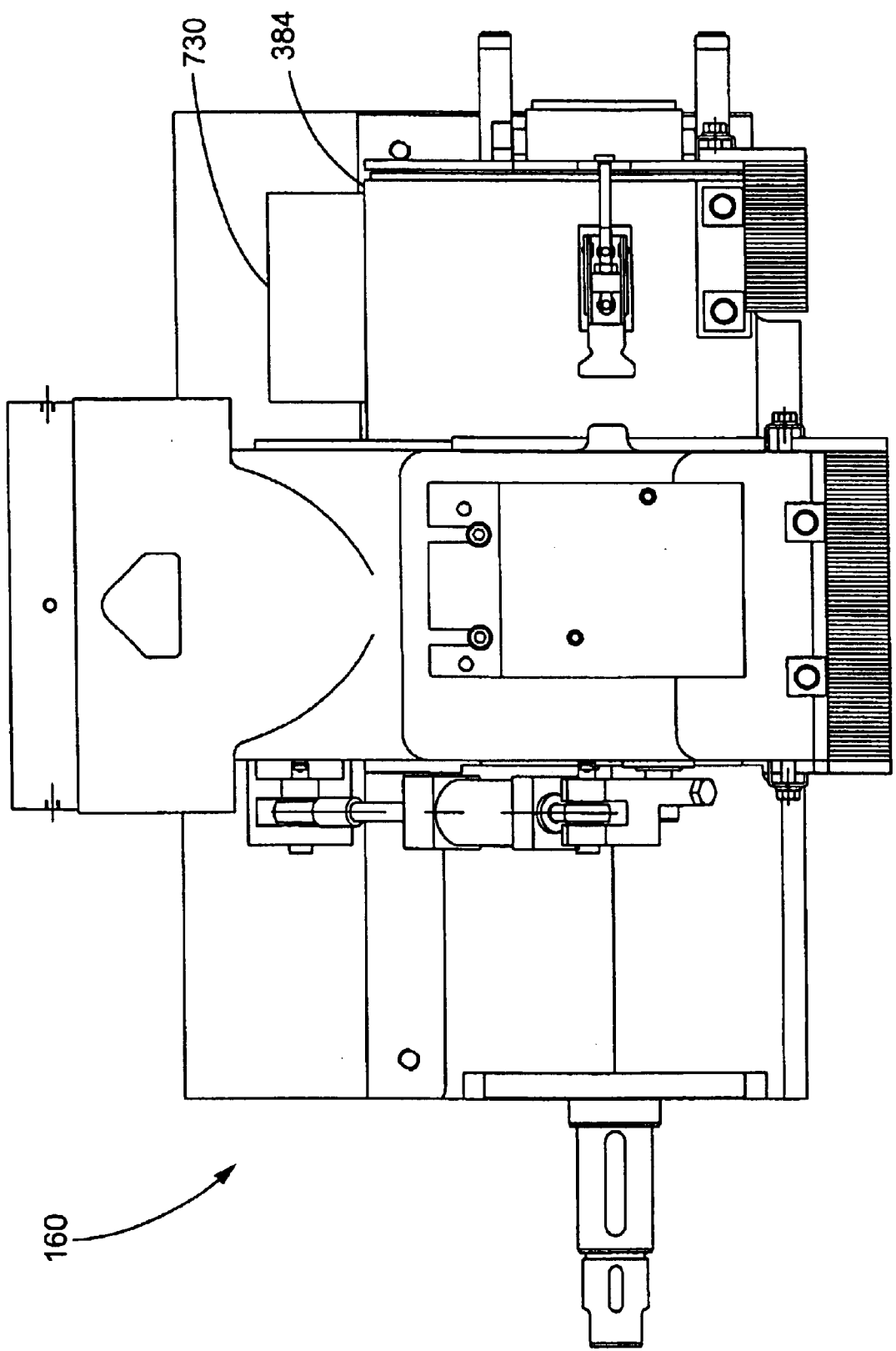
FIG. 15 is a top plan view of the rasp head assembly of FIG. 13.

Referring to FIG. 15, a conduit 730 can be associated with the brush hood 384 to provide a connection point for a collection system to remove any debris generated during a texturing operation of the buffing sequence.

Figure 16:
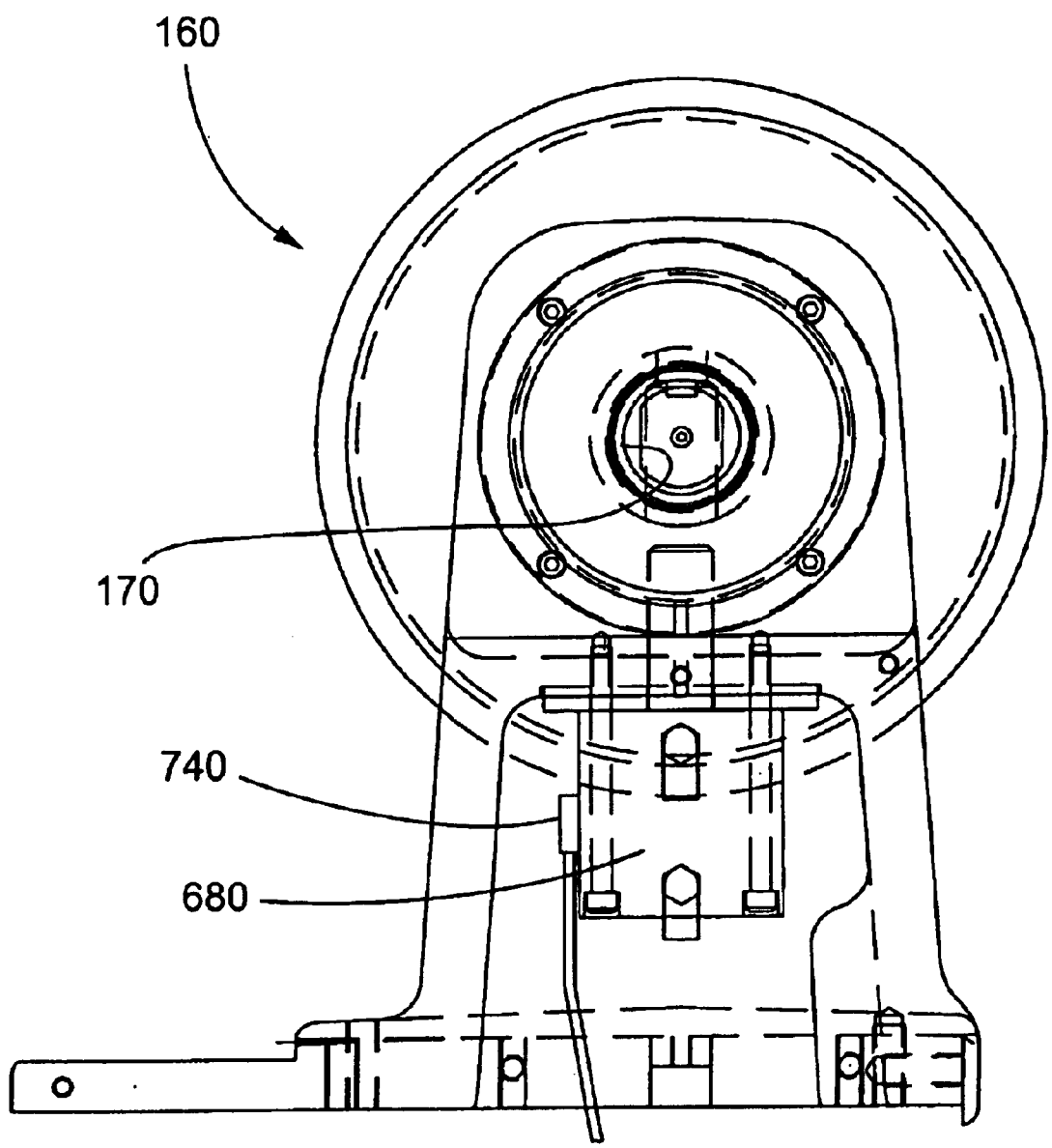
FIG. 16 is a rear elevational view of the rasp head assembly of FIG. 13.

Referring to FIG. 16, a detent proximity sensor 740 can be provided to detect whether the detent cylinder 680 is engaged with the rasp shaft 170. The detent proximity sensor 740 can be electrically connected to the control unit and arranged with the detent cylinder to sense whether the cylinder is in a normal position or in an extended position for engagement with the rasp shaft 170.

Figure 17:
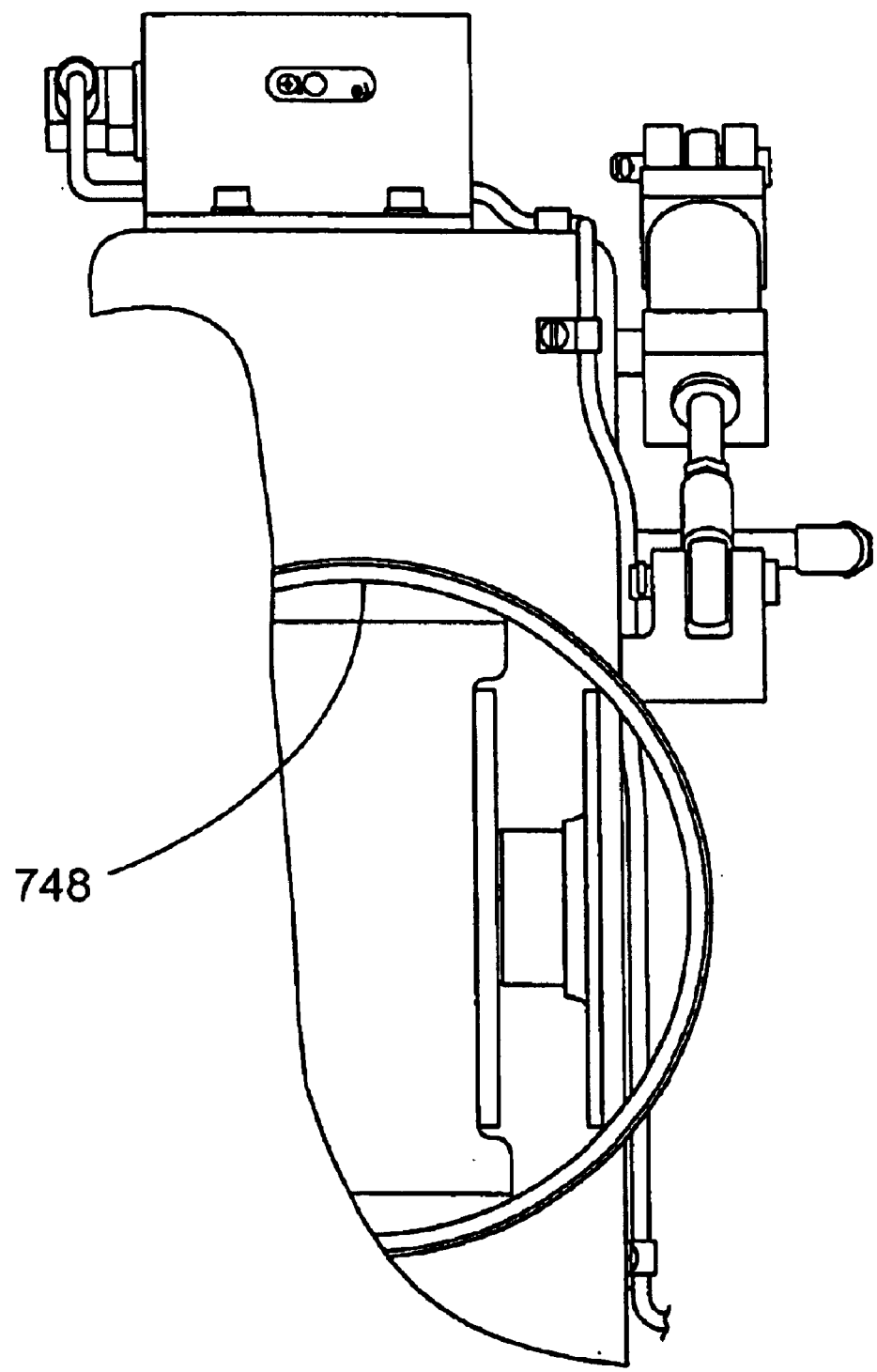
FIG. 17 is a partial, fragmentary second side elevational view of the rasp head assembly of FIG. 13 as viewed from line 17—17 in FIG. 14.

Referring to FIG. 17, the rasp head assembly includes an opening 748 to which the ductwork can be alignedly mounted for allowing debris generated during the main buffing operation of the buffing sequence to be conveyed through the ductwork via the dust collection system. The opening 748 can have an eight-inch diameter, for example.

Figure 18:
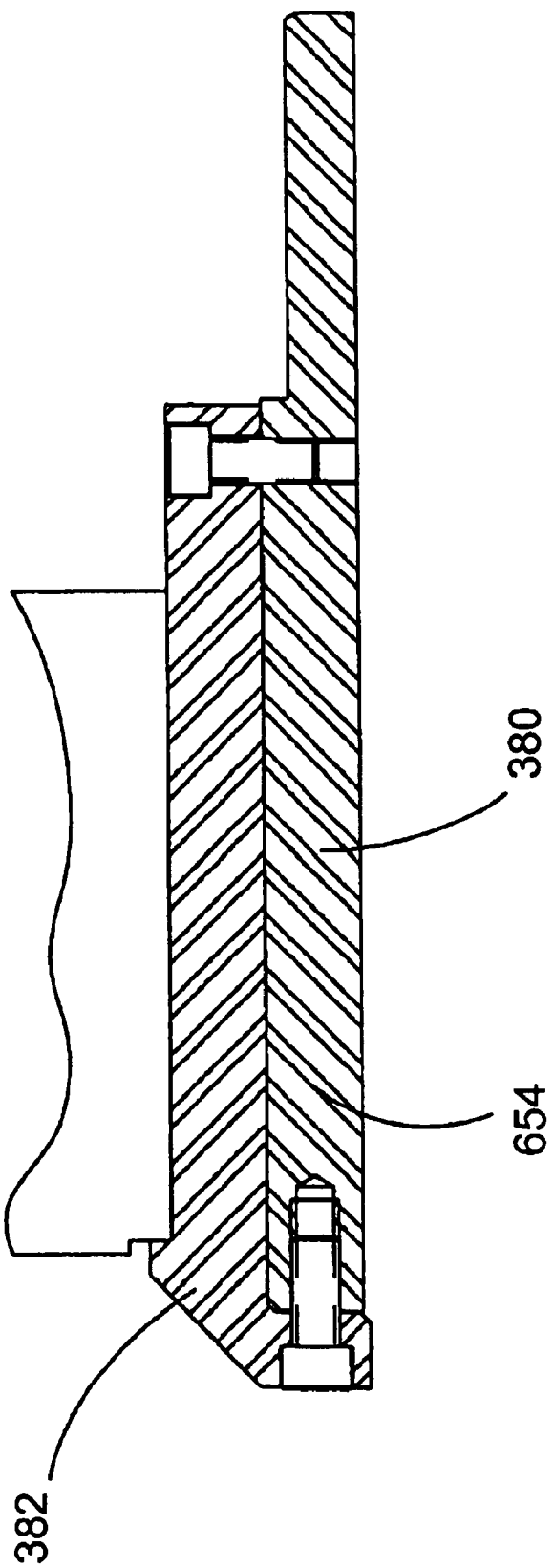
FIG. 18 is a partial, cross-sectional view taken along line 18—18 in FIG. 13.

Referring to FIG. 18, the rasp hood 382 of the rasp head assembly can be mounted to the body 654 of the bearing housing 380 via a plurality of bolts.

Referring to FIGS. 19 and 20, the rasp head 166 of the buffing assembly is shown. The rasp 166 can be any suitable rasp, such as a rasp available from B&J Manufacturing Co., marketed under the name of "Rocket Rasp." The rasp head can include an abrasive serrated edge 770 which can be of conventional configuration. The rasp 166 can include a plurality of rasp blades 772 disposed in alternating fashion. In the illustrative rasp head, the rasp include four quadrants 775, 776, 777, 778 wherein the blades 772 within a particular quadrant are arranged parallel to each other and the blades 772 of adjacent quadrants are arranged in alternating, opposing relationship to each other. The alternating, offset arrangement of the four quadrants 775, 776, 777, 778 of blades of the rasp head can provide an overlapping cutting effect for efficient tread removal during the buffing sequence.

Figure 22:
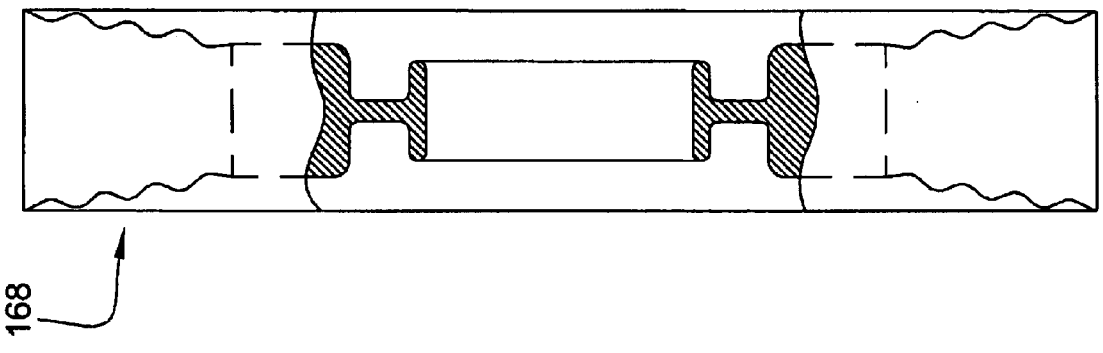
FIG. 22 is an end elevational view, partially in section, of the wire brush of FIG. 21.
Figure 21:
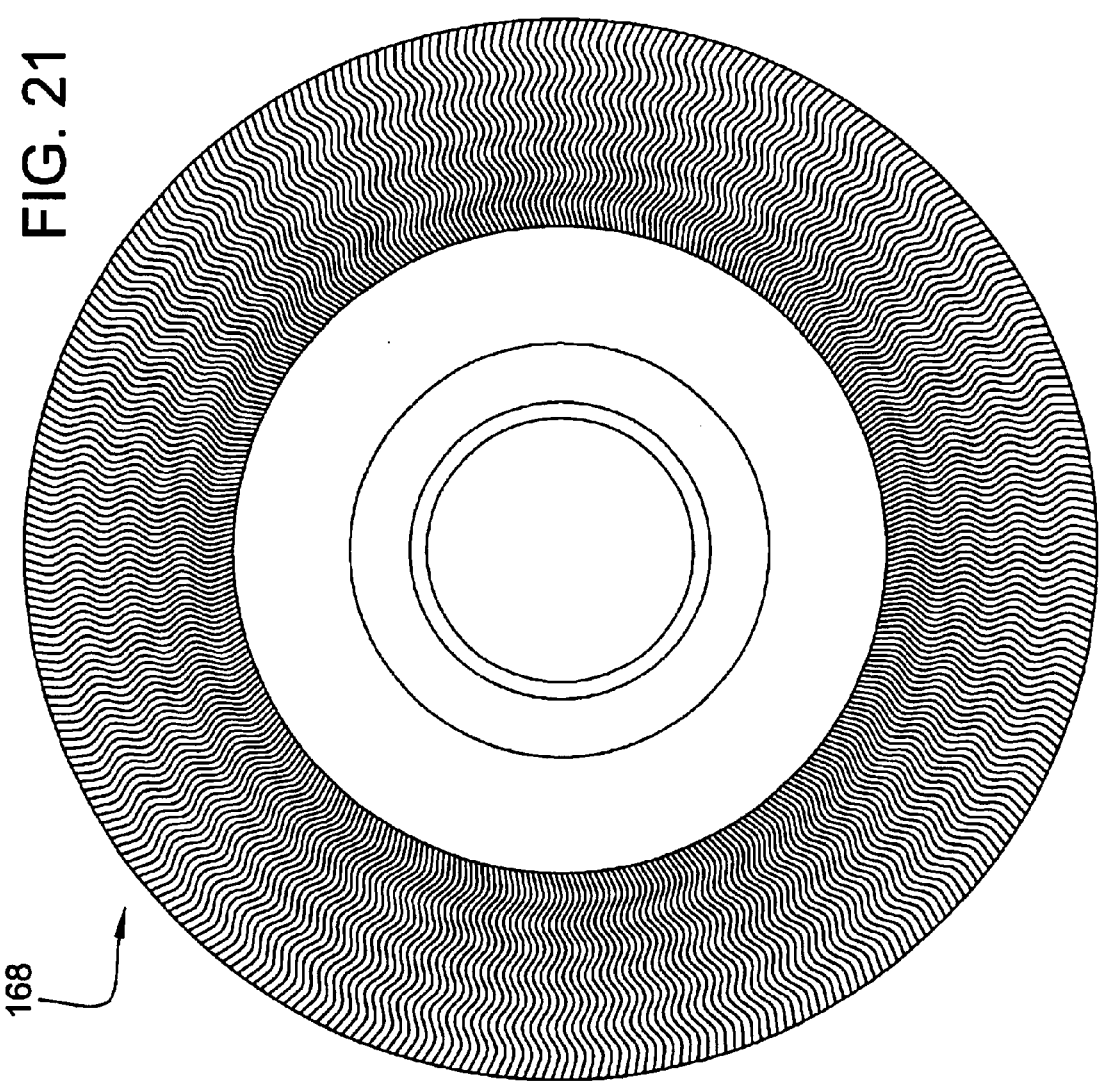
FIG. 21 is a front elevational view of a wire brush of the buffing assembly of FIG. 18.

Referring to FIGS. 21 and 22, the wire brush 168 of the buffing assembly is shown. The wire brush 168 acts as a shoulder-texturing device. The wire brush 168 can be any suitable brush, such as a brush available from Osborn International of Cleveland, Ohio, identified as part number 220-80. The brush 168 can have a diameter of about eight inches, for example. The width of the brush can be about 1¼ inches, for example. The diameter of each wire of the brush can be about 0.0104 inches, for example. The wire bush can have a speed rating of about 4500 rpm, for example. In other embodiments, any other suitable wire brush can be used. In other embodiments, a stone cup can be used as a shoulder-texturing device.

Referring to FIG. 23, a touch screen display 800 is shown. The touch screen display 800 can be displayed on the touch screen at the operator station. The operator can interact with the display 800 to program the tire buffer to operate according to predetermined sequences based on the input information for the displayed parameters. The first touch screen display 800 can include a "recipe" portion 802 wherein characteristics of the tire casing to be buffed and the depth of cut for the rasp head can be displayed and adjusted. The recipe portion provides a user with convenient access to tire characteristics for commonly buffed tire casings which can be recalled by recipe number.

A target radius 804 of the tire after being buffed can be entered on the touch screen. The rasp pedestal of the tire buffer can run through a sequence based on the entered information for buff radius to buff a tire casing mounted on the tire hub assembly 116. The operator can enter different buff radii over a predetermined range of radii by interfacing with the control unit through the touch screen.

The control unit can move the rasp pedestal along a predetermined buffing path which can be based upon the type of tire casing being buffed. The buffing path can include a plurality of passes wherein the rasp pedestal moves the rasp head transversely across the width of the tire casing to define the predetermined tire casing profile. A rasp head depth of cut 806 can be displayed on the first display 800 of the touch screen as a value of inches. The depth of cut indicates the distance of overlap in a pass between the rasp head and a tire casing mounted to the tire hub assembly for buffing, i.e., the depth of cut is the distance the rasp head is inserted into the tire casing as it moves transversely across the width of the tire casing in a pass of the buffing path. The user can change the value of the rasp depth of cut by interfacing with the control unit via the touch screen.

The control unit can manipulate the rasp pedestal with respect to a tire casing mounted to the tire hub assembly to perform a shoulder trimming operation. A trim angle 808 can be displayed on the first display 800 of the touch screen to indicate to the user that angle at which the shoulder will be trimmed by the rasp head of the rasp pedestal 112. The user can change the value of the shoulder trim angle by interfacing with the control unit via the touch screen.

The operator can designate the type of tire being buffed by interfacing with the control unit via a "tread" portion 810 of the first display of the touch screen. The tread portion 810 includes areas where the user can input a tread name, a tread type, and a tread size, for example.

The display can indicate the mode in which the tire buffer 100 is operating by lighting an indicator bar 812 to indicate which operation the tire buffer 100 is currently performing, such as a measuring operation, a sharpening operation, a brushing operation (also called a texturizing operation), and a trimming operation, for example.

The display can include a rasp drive current indicator 820 provided to indicate the measured current draw of the rasp drive motor expressed as a percentage of a predetermined, full-load current value. The indicator can include a bar graph 822 having indicia to indicate the measured current value, for example over a range of 0% to about 175%. The bar graph 822 can be illuminated from the 0 indicia to the measured value to provide a readily readable visual indication of the measured current draw of the rasp drive motor.

The display 800 can also display information pertaining to the components of the tire buffer 100. For example, the display can indicate the wear on the rasp by displaying the number of tires the buffer can buff before the next scheduled sharpening of the rasp.

The display can include an operating portion 830 which can allow the user to interface with the control unit to operate the tire buffer 100. The operating portion can include a start button 832, an abort button 834, and a pause button 836, which the operator can press to start, stop, and pause the tire buffing sequence, respectively.

Figure 24:
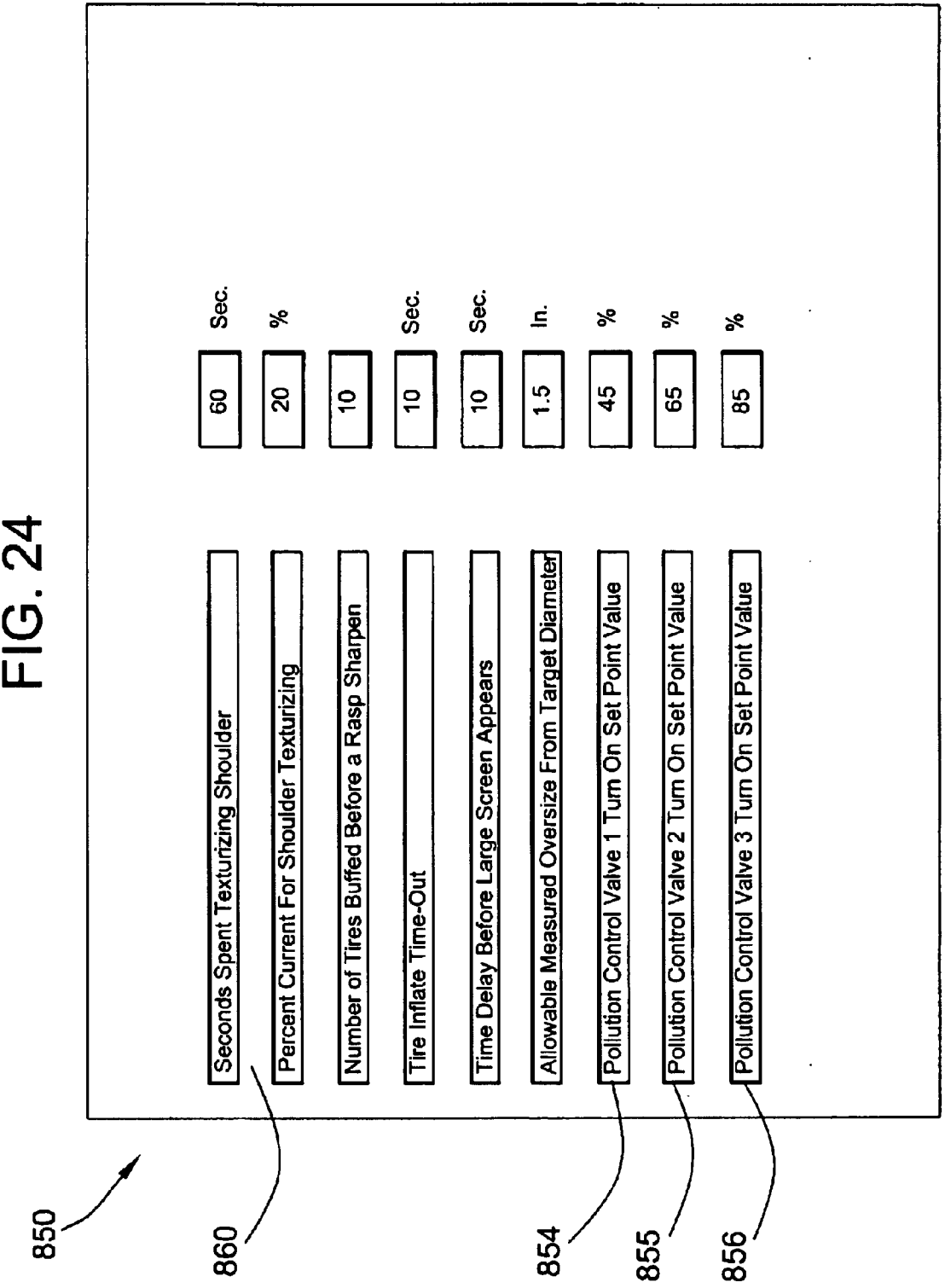
FIG. 24 is a schematic view of a second touch screen display.

Referring to FIG. 24, a second touch screen display 850 is shown. The second display 850 can allow a user to establish values for predetermined parameters of the tire buffer. For example, the display includes areas 854, 855, 856 where the operator can define points at which the three water lines which communicate with the interior of the rasp hood open to direct water onto the rasp head during the buffing sequence. The user can direct the control unit to open the three water valves independently based on the measured current draw of the rasp drive motor. In the illustrative embodiment, the first valve is programmed to open once the rasp drive current draw reach a first value, 45% of a predetermined full load current draw. The second valve is programmed to open once the rasp drive current draw reaches a second value, 65% of the full-load current draw. The third valve is programmed to open once the rasp drive current draw reaches a third value, 85% of the full-load current draw. The second touch screen display 850 can allow these values to be changed by the user by interfacing with the screen and inputting new values.

The control unit can advance the rasp pedestal toward the tire casing during a shoulder texturizing operation until the measured current draw of the rasp drive motor reaches a predetermined value, for example. The user can set the shoulder texturizing value through interfacing with the touch screen using the second touch screen display 850 at a shoulder texturizing area 860. For example, the illustrative embodiment indicates the shoulder texturizing value is 20% of the full-load current draw of the rasp drive motor. The shoulder texturizing value can be changed by the user through interfacing with the second touch screen display to input a new value.

The second touch screen 850 can be used to control other operating parameters of the tire buffer 100, such as the number of tires which can be buffed between rasp head sharpenings and tire inflation timing conditions, for example.

Figure 25:
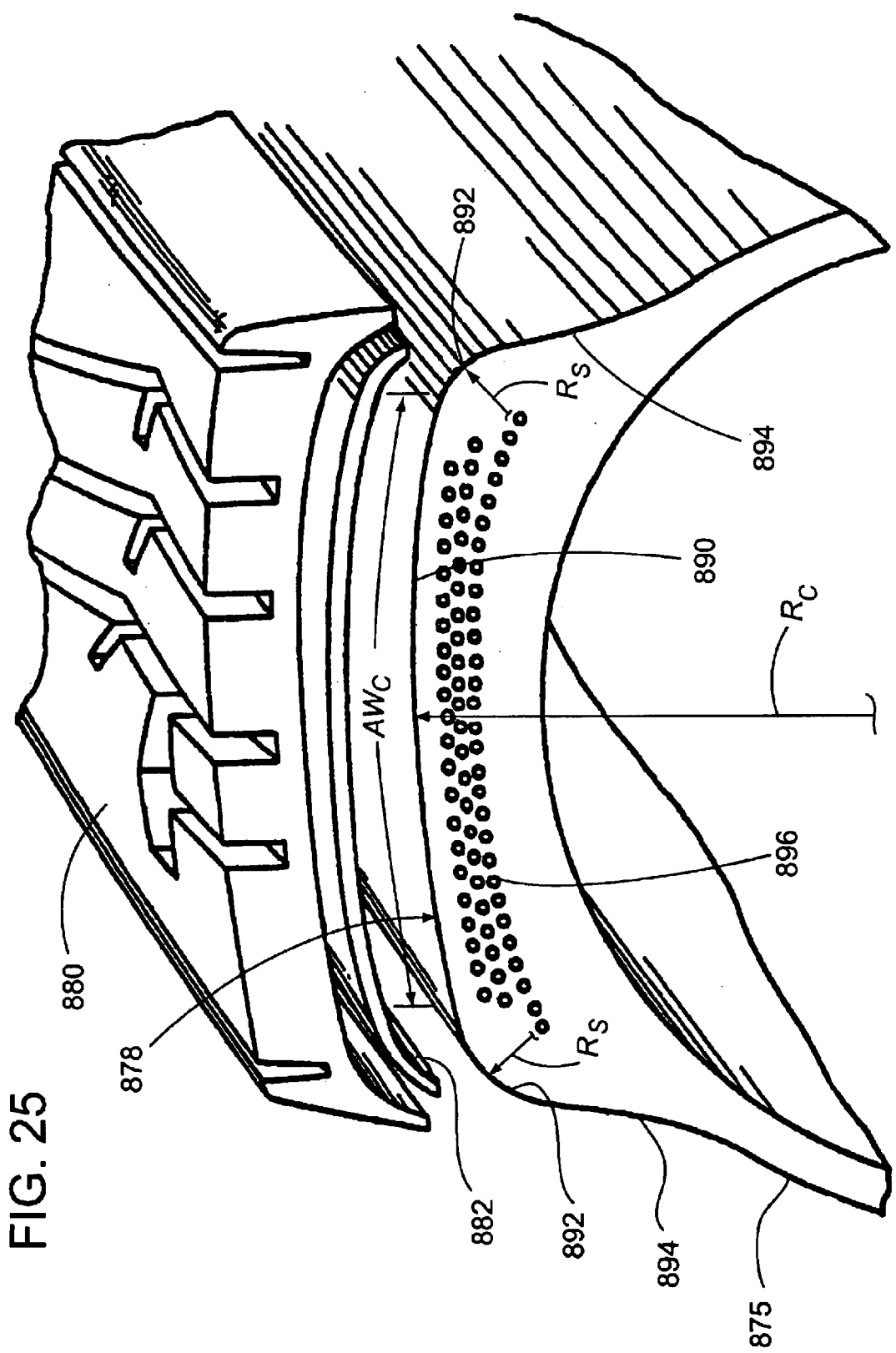
FIG. 25 is a cross-sectional view of a tire casing illustrating a tire casing profile which can be defined by the tire buffer of the present invention and of a replacement tread for application to the tire casing.

Referring to FIG. 25, a tire casing 875 is shown which includes a tire casing profile 878 that can be defined by the tire buffer. Once buffed by the tire buffer, a replacement tread 880 can be applied to the tire casing, with a layer of cushion gum 882 disposed therebetween, according to any known method. The tire casing 875 includes a crown portion 890 bounded on each side by a respective shoulder portion 892 and a respective side wall 894. The tire casing 875 can include a belt package 896 underlying the crown 890. The crown 890 and the shoulders 892 of the casing 875 present a tire casing profile 878 that can be suitably formed to a predetermined configuration with the tire buffer.

The surface of the crown 890 can be mechanically buffed to provide a textured, convex arcuate configuration in a direction transverse to the circumference of the casing 875. The arc can have a characteristic radius of curvature, i.e., the crown radius $R_c$, which can generally corresponds to the upper contour of the belt package 896, extending above the top belt by a predetermined thickness, such as 3/32 of an inch, for example. The length of the arc at the crown radius extending between the shoulders 892 defining the crown 890, i.e., the crown arc width $AW_c$, can be set at a predetermined value. The crown radius $R_c$ and the crown arc width $AW_c$, can be characteristic to tire casings of particular models and/or sizes of tires. The tire casing from each variety of new tire can have a characteristic crown radius and crown arc width.

The shoulders 892 of the tire casing 875 can also be contoured in the shape of convex arcs which can have a predetermined buffed shoulder radius $R_s$ that can be substantially less than the crown radius $R_c$. For example, for casings having a buffed crown radius $R_c$ of from about twenty inches to about thirty inches, the corresponding shoulder radius $R_s$ can be in the range from about 0.3125 inches to about 1.625 inches. A typical shoulder radius $R_s$ can be about one inch.

The crown radius $R_c$ of the buffed tire casing is a characteristic of the particular tire from which the casing 875 derives and can vary from tire to tire. A common predetermined crown arc width $AW_c$ can be accommodated by casings derived from a variety of sizes of new tires, notwithstanding their having different crown radii $R_c$, particularly when the shoulder of the tire casing 875 is formed as a convex arc in the manner of the illustrative shoulders 892 shown in FIG. 25. The crown arc width $AW_c$ can be chosen to approximate the tread width of the new tire from which the tire casing 875 derives. To approximate the tread widths of a range of tires, the crown arc width $AW_c$ can be chosen as a median new tire tread width for tires in a series from which the tire casing 875 derives. Preferably, the crown arc width $AW_c$ is less than the width of the tread by about 1/16$^{th}$ of an inch.

The crown radius $R_c$ of the tire casing can be in the range of about 20 inches to about 32 inches, for example. Larger crown radii, up to about 52 inches, for example, can be buffed using the tire buffer. For tires having a crown radius $R_c$ in the range of about 20 inches to about 32 inches, the corresponding crown arc width $AW_c$ can be in the range of about 7.9 inches to about 9.8 inches.

Figure 26:
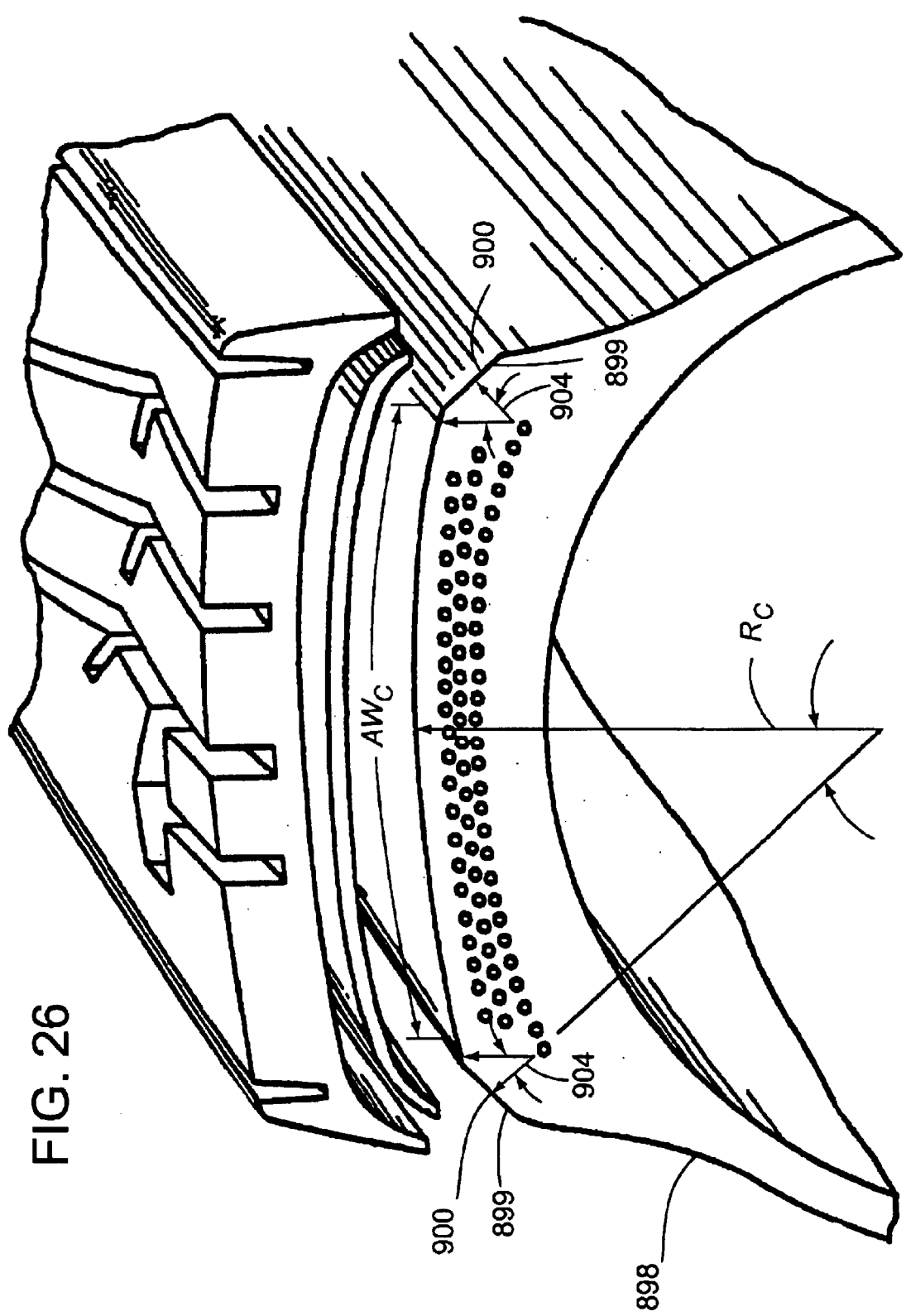
FIG. 26 is a cross-sectional view of another embodiment of a tire casing illustrating a tire casing profile which can be defined by the tire buffer of the present invention and of a replacement tread for application to the tire casing.

Referring to FIG. 26, another tire casing 898 is shown with shoulders 899 that are substantially planar. Faces 900 of the shoulders 899 can be disposed at opposing shoulder angles 904, measured with respect to the radial axis of the tire casing 898, of about 48°, for example.

Referring to FIGS. 27–31, a tire buffing sequence performed by the tire buffer 100 of the present invention is illustrated.

Figure 27:
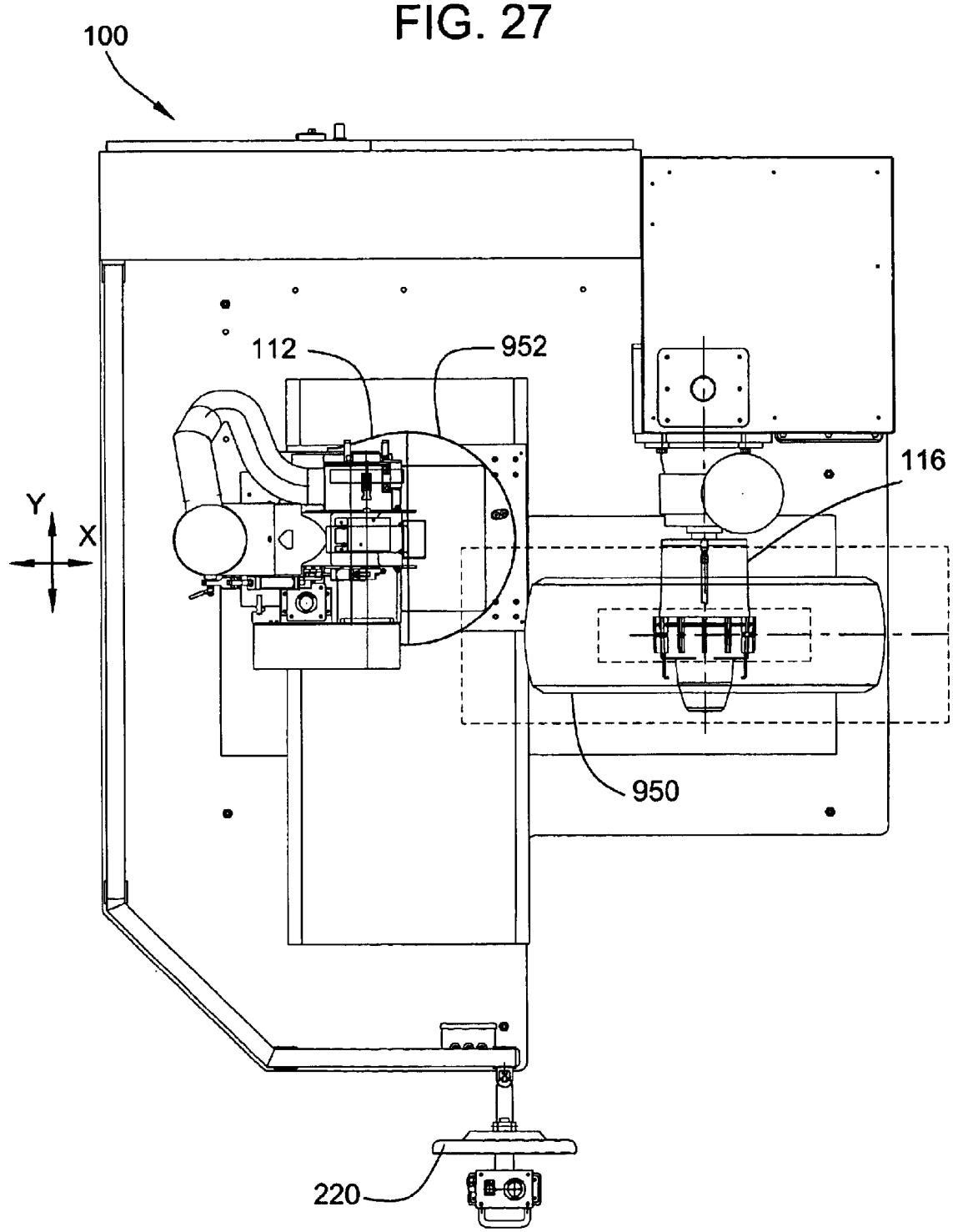
FIG. 27 is a top plan view of the tire buffer of FIG. 1 with a tire casing mounted to a hub assembly thereof and the rasp pedestal of the tire buffer in a home position.

Referring to FIG. 27, a tire casing 950 is mounted to the tire hub assembly 116 such that the radial axis of the tire casing is substantially parallel to the X axis. The rasp pedestal 112 of the tire buffer 100 is disposed in a home position 952. The rasp pedestal 112 can be placed in the home position via the control unit which is electrically connected to the X and Y home position sensors. The tire buffer 100 can accommodate a tire casing having different diameters. The operator can initiate the buffing sequence via the touch screen 220.

Figure 28:
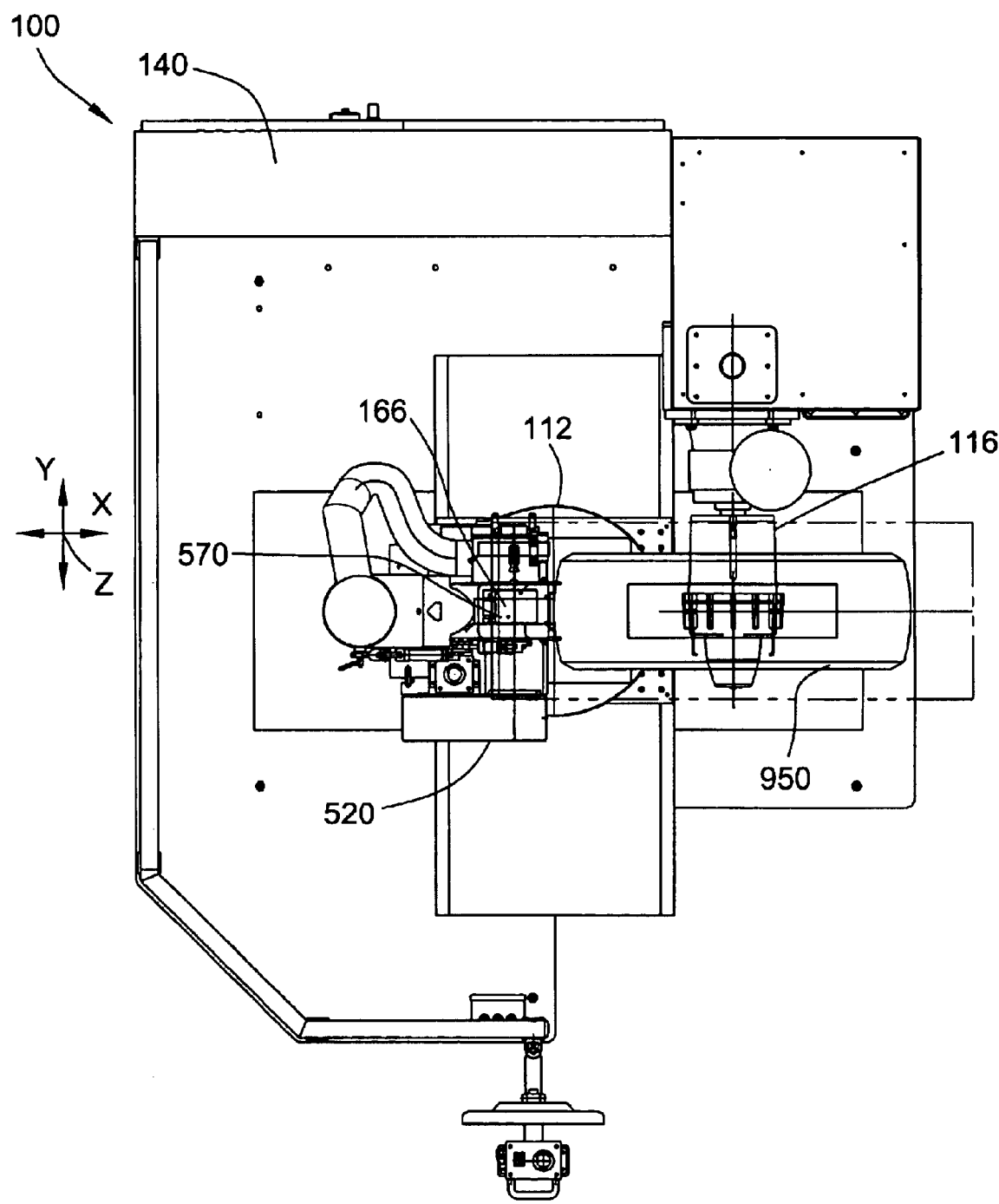
FIG. 28 is a top plan view of the tire buffer of FIG. 1 and the tire casing as in FIG. 27 with the rasp pedestal in a measurement position to performing a tire measurement operation.

Referring to FIG. 28, the tire buffer 100 can perform a tire casing measurement operation. The rasp pedestal 112 can be moved from the home position along the Y axis until it is substantially aligned with the tire casing 950 along the Y axis. The rasp pedestal 112 can be advanced along the X axis toward the tire hub assembly 116 while tire hub assembly 116 rotates the tire casing 950. The rasp pedestal 112 can be advanced toward the tire casing 950 at a first rate of speed until the tire locating sensor 570 detects that the rasp pedestal 112 is within a predetermined distance from the tire casing 950 whereupon the locating sensor 570 can signal the control unit 140. The control unit 140 can slow the rasp pedestal 112 to a second rate of speed convenient for performing the tire measurement operation. The rasp pedestal 112 can advance along the X axis toward the tire casing 950 at the second rate of speed until the tire measurement mechanism 520 detects that the rasp 166 has engaged the tire casing 950.

To determine the size of the tire casing 950, the control unit 140 can monitor the position of the rasp pedestal 112, tracking its movement from the known, home position to the position it is in when the tire measurement mechanism 520 detects that the rasp has engaged the tire casing. The tire hub assembly 116 can be located at a second, known position. Once the rasp is brought into contact with the rotating tire casing, the rasp will begin to rotate in response, which in turn causes the rasp shaft and the sprocket to rotate. The proximity sensor of the tire measurement mechanism can signal the control unit that the sprocket is moving whereupon the control unit can direct the rasp pedestal 112 to stop moving toward the tire hub assembly 116. The control unit 140 can determine the size of the tire casing 950, for example the tire casing diameter, by comparing the known position of the tire hub assembly 116 with the position of the rasp pedestal 112 at the time the sprocket first moves.

The tire measurement can be taken anywhere along the width, measured along the Y axis, of the tire casing 950 to allow an operator to identify a high side, for example. In the case where the tire casing has such a high side, the operator can measure the size of the tire casing by positioning the rasp head to be aligned with the identified high side.

Once the size of the tire is determined, the control unit can move the rasp pedestal 112 through a buffing path based on the type and size of the tire casing being buffed, for example. The rasp pedestal 112 can be moved through a plurality of passes wherein the rasp pedestal 112 is moved transversely across the width of the tire casing to buff the tire to a predetermined buffed size with a predetermined tire casing profile. The rasp pedestal 112 can be moved along the X and Y axes and rotated about the Z axis while moving through the buffing path to achieve the desired buffed tire casing.

The rasp head 166 can be set at a predetermined depth of cut for each pass of the buffing path such that the rasp head cuts into the tire casing 950 a predetermined amount in a direction perpendicular to the direction of travel of the rasp head along the buffing path.

Figure 29:
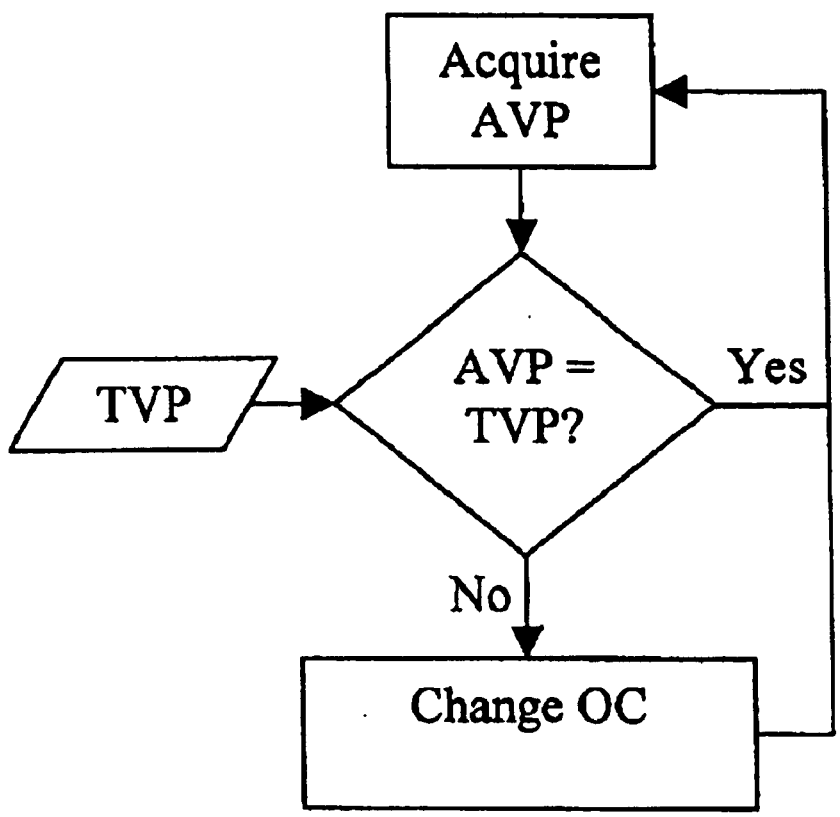
FIG. 29 is a block diagrammatic view of an adjusting sequence for efficiently removing tire material during a buffing operation.

Referring to FIG. 29, the tire buffer 100 can perform an adjusting sequence for increasing the efficient removal of tire material during the buffing operation. The control unit can monitor an operating parameter of the rasp pedestal 112 or the tire hub assembly 116 during the buffing sequence. A predetermined target value for the selected operating parameter TVP can be calculated. The control unit can compare the actual value of the operating parameter AVP to the calculated target value of the parameter TVP and adjust an operating characteristic OC of the rasp pedestal 112, the tire hub assembly 116, or both to control the actual value of the operating parameter AVP such that it is urged toward the calculated target value of the operating parameter TVP. In the event that the actual value of the operating parameter AVP is equal to the target vale of the operating parameter TVP, the control unit can maintain the operating characteristic OC at its current condition.

In one embodiment, the control unit can monitor the current draw of the rasp drive motor, for example. The rasp drive motor can have a predetermined full-load capacity at which its current draw is a particular value and at which the motor can remove material from the tire casing at an efficient rate while preventing damage to the motor or other components of the tire buffer. The value of the predetermined target current draw can be based upon such considerations as the capabilities of the motor driving the cutter, the maximum depth of cut for the selected cutter, the maximum traverse speed the buffer is capable of generating, and the wear of the cutter itself. The control unit can compare the actual current draw of the rasp drive motor to the calculated target current draw and determined whether the actual current draw is equal to the target current draw. If the actual and target current draws are different, the control unit can move the rasp pedestal at different rates of speed by selectively controlling the rasp moving assembly to adjust the actual current draw such that it moves toward the target current draw. The traverse rate of speed of the rasp pedestal can be increased to increase the actual current draw of the motor and decreased to decrease the actual current draw of the motor. The depth of cut and the rate of rotation of the tire casing can remain constant during the buffing operation.

In another embodiment, the rasp cutter speed can be determined by the operator before the buffing operation, and the feed rate, the depth of cut of the rasp head, can be adjusted during buffing based on the difference between actual current draw and the predetermined target current draw of the rasp drive motor. A finishing pass or passes can be performed to define the tire casing profile.

In other embodiments, the current draw of the tire drive motor, the speed of the rasp drive motor, or the speed of the tire drive motor, for example, can be monitored. In other embodiments, the depth of cut of the rasp head or the rotational speed of the tire casing can be adjusted to adjust the actual value of the selected operating parameter.

Figure 30:
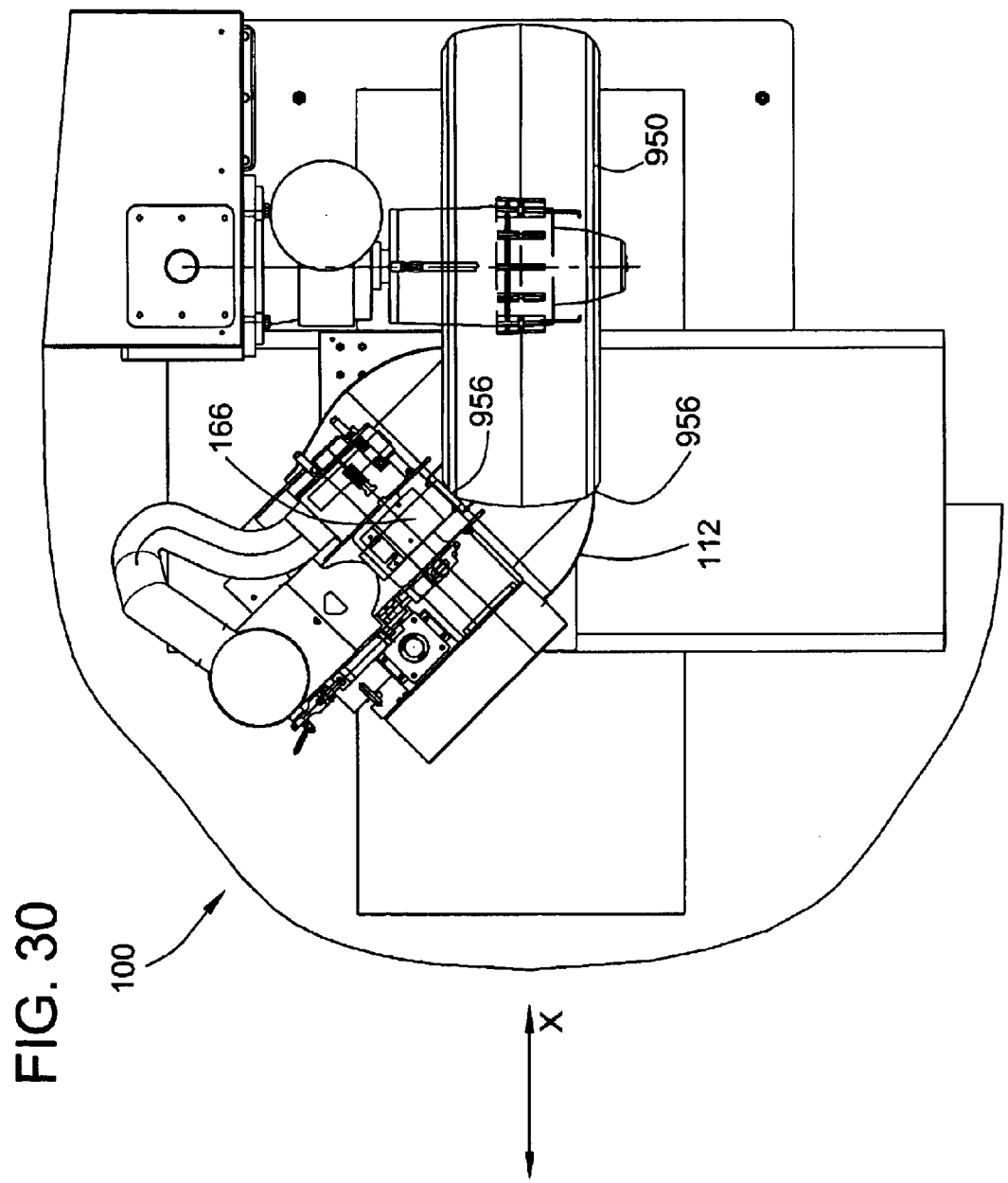
FIG. 30 is a top plan view of the tire buffer of FIG. 1 and the tire casing as in FIG. 27 with the tire buffer performing a shoulder trimming operation.

Referring to FIG. 30, tire buffer 100 can perform a shoulder trimming operation. The control unit can engagingly position the rasp head of the rasp pedestal 112 with respect to the tire casing 950 to perform the shoulder trimming operation in shoulder positions on both sides of the tire casing. The shoulder positions can be mirror images to each other about the X axis. The shoulders 956 can be formed at a predetermined angle based on the type of tire casing being buffed. The shoulders can be defined to be substantially planar faces disposed at a predetermined shoulder angle. In other embodiments, the shoulders can be contoured having their own predetermined shoulder radius.

Figure 31:
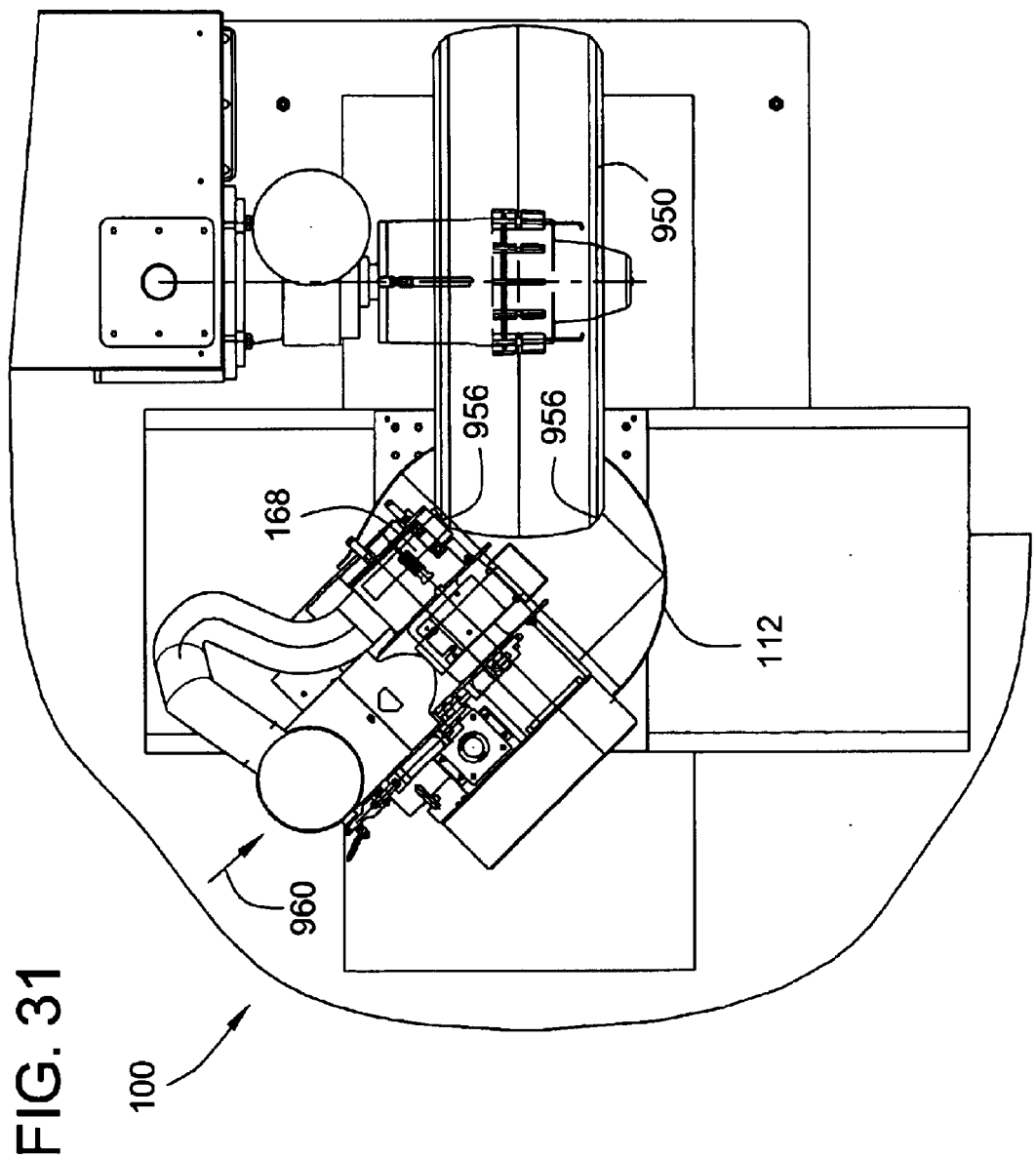
FIG. 31 is a top plan view of the tire buffer of FIG. 1 and the tire casing as in FIG. 27 with the tire buffer performing a shoulder texturing operation.

Referring to FIG. 31, the tire buffer 100 can perform a shoulder texturing operation with the texturizing device, the wire brush 168. The brush 168 can be brought into contact with the respective shoulders 956 of the tire casing 950 with the rasp pedestal 112 moving toward the respective shoulder of the tire casings along a predetermined line of movement 960, such as along a line substantially perpendicular to the face of the shoulder. The rasp pedestal 112 can so move until the control unit detects that the actual current draw of the rasp drive motor reaches a predetermined value, such as 120% of a no-load current draw of the rasp drive motor, for example, whereupon the rasp pedestal 112 can stop moving toward the tire casing 950. The wire brush 168 can act upon each shoulder 956 for a predetermined length of time, ten seconds, for example, to provide a desired texture surface for the shoulders, such as an RMA value of about 2, for example.

In other embodiments, the control unit can position the rasp pedestal for texturing the shoulders by monitoring another parameter, such as, the temperature at the surface of the shoulder of the tire casing, the force applied between the rasp pedestal and the tire casing, the actual current draw of the tire drive motor, or the current draw of the moving assembly, for example, and placing the pedestal in a position where the monitored parameter has a predetermined value.

The tire buffer 100 of the present invention can allow for tire buffing operations to occur at a more efficient rate than prior automated systems. For example, tire buffing tests conducted with the model 8200 tire buffer manufactured by Bandag, Inc. have shown that a typical tire buffing cycle requires 2.5 minutes, yielding about 20 buffed tires per hour. In tests conducted with the tire buffer of the present invention, a typical tire buffing cycle requires only 2 minutes, yielding about 25 tires per hour. Furthermore, the automated features of the tire buffer of the present invention allow an operator to operate another machine, and possibly two other machines, while operating the tire buffer, thereby improving the productivity of each operator. For example, in a typical 2 minute tire buffing cycle with the tire buffer, an operator can devote 20 seconds of the 120 second period to loading and unloading the tire buffer, leaving 100 seconds to devote to another machine or machines.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise indicated.

While the invention is described herein in connection with certain preferred embodiments, there is no intent to limit the present invention to those embodiments. On the contrary, it is recognized that various changes and modifications to the described embodiments will be apparent to those skilled in the art upon reading the foregoing description, and that such changes and modifications may be made without departing from the spirit and scope of the present invention. The inventors expect skilled artisans to employ such variations as appropriate, and the inventors intend for the invention to be practiced otherwise than as specifically described herein. Accordingly, the intent is to cover all alternatives, modifications, and equivalents included within the spirit and scope of the invention. Moreover, any combination of the above-described elements in all possible variations thereof is encompassed by the invention unless otherwise indicated herein or otherwise clearly contradicted by context.

What is claimed is:

1. A tire buffing apparatus for buffing a tire casing, the tire buffing apparatus comprising:
   a base;
   a rasp pedestal, the rasp pedestal including a rasp head and a texturing device;
   a moving assembly mounted to the base assembly, the moving assembly connected to the rasp pedestal for selectively moving the rasp pedestal along a pair of perpendicular axes, the rasp pedestal pivotable about a vertical axis with respect to the moving assembly;
   a tire hub assembly for supporting and rotating the tire casing, the tire hub assembly mounted to the base at a predetermined location;
   a control unit operatively arranged with the rasp pedestal, the moving assembly, and the tire hub assembly for selective operation thereof, the control unit capable of monitoring the position of the rasp pedestal with respect to the tire hub assembly;
   wherein the rasp pedestal is movable into engagement with a tire casing mounted to the tire hub assembly such that the rasp head can contact the tire casing to buff the tire casing to impart a predetermined tire casing profile and such that the texturing device can contact the tire casing to impart a predetermined texture to at least a portion of the tire casing.

2. The tire buffing apparatus according to claim 1, further comprising:
   an operator station, the operator station extending from the base assembly, the operator station having a touch screen electrically connected to the control unit, the touch screen comprising an operator interface for the control unit.

3. The tire buffing apparatus according to claim 2, wherein the touch screen is adjustably mounted to the base.

4. The tire buffing apparatus according to claim 1, wherein the rasp pedestal includes a conduit for connection to a collection system.

5. The tire buffing apparatus according to claim 1, wherein the moving assembly includes a base runner, an X table, and a Y table, the base runner mounted to the base, the X table movably mounted to the base runner such that the X table is movable along an X axis, the Y table movably mounted to the X table such that the Y table is movable along a Y axis, the Y axis being perpendicular to the X axis.

6. A tire buffing apparatus for buffing a tire casing, the tire buffing apparatus comprising:
   a rasp pedestal, the rasp pedestal including a rasp head and a texturing device;
   a moving assembly connected to the rasp pedestal for selectively moving the rasp pedestal along a pair of perpendicular axes;
   a tire hub assembly for supporting and rotating the tire casing;
   wherein the moving assembly is operable to move the rasp pedestal into engagement with a tire casing mounted to the tire hub assembly such that the rasp head can contact the tire casing to buff the tire casing to impart a predetermined tire casing profile and such that the texturing device can contact the tire casing to impart a predetermined texture to at least a portion of the tire casing.

7. The tire buffing apparatus according to claim 6, wherein the rasp pedestal includes a support assembly and a rasp head assembly, the rasp head assembly housing the rasp head and the texturing device.

8. The tire buffing apparatus according to claim 6, wherein the texturing device comprises a wire brush.

9. The tire buffing apparatus according to claim 6, wherein the rasp pedestal includes a rasp drive motor operably arranged with a rasp shaft, the rasp head and the texturing device mounted to the rasp shaft for rotation thereof.

10. The tire buffing apparatus according to claim 9, wherein the rasp pedestal includes a detent cylinder operably arranged with the rasp shaft to selectively prevent the shaft from rotating.

11. The tire buffing apparatus according to claim 6, wherein the rasp pedestal includes a plurality of feed lines which are arranged to selectively dispense fluid therefrom onto the rasp head.

12. The tire buffing apparatus according to claim 6, wherein the rasp head is mounted to a rasp shaft, the rasp pedestal includes a tire measurement mechanism arranged with the rasp head to detect movement thereof, the tire measurement mechanism arranged with the control unit to signal the control unit upon sensing movement of the rasp head, the control unit configured to monitor the location of the rasp pedestal with respect to the tire hub assembly.

13. The tire buffing apparatus according to claim 6, wherein the rasp pedestal includes a tire sensor, the tire sensor arranged on the pedestal such that it can detect a tire casing mounted to the tire hub assembly when the rasp pedestal is within a predetermined distance of the tire hub assembly.

14. The tire buffing apparatus according to claim 6, wherein the rasp pedestal includes a rasp shaft, a support plate, a rasp drive motor, and a belt, the rasp head connected to the rasp shaft, the drive motor pivotally connected to the support plate, the drive motor operably arranged with the rasp shaft via the belt, the drive motor pivotal with respect to the support plate to adjust the tension of the belt.

15. A tire buffing apparatus for buffing a tire casing, the tire buffing apparatus comprising:
   a tire hub assembly for supporting and rotating the tire casing;
   a rasp pedestal, the rasp pedestal including a rasp shaft, a rasp head mounted thereto, and a tire measurement mechanism arranged with the rasp head to detect movement thereof, the rasp pedestal movable with respect to the tire hub assembly; and
   a control unit, the control unit configured to monitor the location of the rasp pedestal with respect to the tire hub assembly, and the tire measurement mechanism arranged with the control unit to signal the control unit upon sensing movement of the rasp head in response to the rasp head engaging the tire casing rotating on the tire hub assembly, whereby the control unit can determine the size of the tire casing mounted to the tire hub assembly.

16. The tire buffing apparatus according to claim 6, wherein the tire measurement mechanism includes a sprocket mounted to the rasp shaft and a proximity sensor arranged with the sprocket to detect movement thereof, the proximity sensor electrically connected to the control unit.

17. A tire buffing apparatus for buffing a tire casing, the tire buffing apparatus comprising:
- a tire hub assembly for supporting and rotating the tire casing;
- a rasp pedestal, the rasp pedestal including a rotatable texturing device, the rasp pedestal movable with respect to the tire hub assembly; and
- a control unit, the control unit configured to monitor the location of the rasp pedestal with respect to the tire hub assembly, and the control unit operable to move the rasp pedestal with respect to the tire hub assembly such that the texturing device can contact the tire casing to impart a predetermined texture to at least a portion of the tire casing mounted to the tire hub assembly.

18. The tire buffing apparatus according to claim 17, wherein the texturing device comprises a wire brush.

19. The tire buffing apparatus according to claim 17, wherein the rasp pedestal includes a drive motor for rotating the texturing device, a current sensor is associated with the drive motor for sensing the current draw of the drive motor, the current sensor being electrically connected to the control unit for conveying the value of the current draw to the control unit, the control unit capable of moving the rasp pedestal toward the tire casing mounted to the tire hub assembly with the texturing device rotating until the current sensor signals the control unit that the current draw of the drive motor reaches a predetermined value.

20. A tire buffing apparatus for buffing a tire casing, the tire buffing apparatus comprising:
- a tire hub assembly for supporting and rotating the tire casing;
- a rasp pedestal, the rasp pedestal including a rotatable rasp head, the rasp pedestal movable with respect to the tire hub assembly; and
- a control unit, the control unit configured to monitor the location of the rasp pedestal with respect to the tire hub assembly, and the control unit operable to monitor an operating parameter of one of the rasp pedestal and the tire hub assembly while buffing the tire casing mounted to the tire hub assembly, compare the actual value of the operating parameter to a predetermined target value of the parameter, and adjust an operating characteristic of at least one of the rasp pedestal and the tire hub assembly such that the actual value of the operating parameter is urged toward the target value of the operating parameter.

21. The tire buffing apparatus according to claim 20, wherein the rasp pedestal includes a rasp drive motor for rotating the rasp head, the operating parameter comprises the current draw of a rasp drive motor, and the operating characteristic comprises the feed rate of the rasp pedestal as the pedestal traverses the tire casing mounted to the tire hub assembly to buff the casing.

22. A method for buffing a tire casing comprising:
- mounting the tire casing to a tire hub assembly for rotating the tire casing;
- rotating the tire casing;
- moving a rasp pedestal relative to the tire hub assembly toward the tire hub assembly, the rasp pedestal including a rasp head;
- monitoring the position of the rasp pedestal;
- detecting when the rasp head engages the tire casing by a measurement mechanism mounted to the rasp pedestal; and
- determining the size of the tire casing by comparing the location of the tire hub assembly to the location of the rasp pedestal when the rasp head engages the tire casing.

23. The method according to claim 22, wherein the rasp pedestal includes a rotatable rasp shaft to which the rasp head is mounted, the tire measurement mechanism includes a sprocket mounted to the rasp shaft and a proximity sensor arranged with the sprocket to detect movement thereof.

24. The method according to claim 22, further comprising:
- detecting the tire casing mounted to the tire hub assembly when the rasp pedestal is within a predetermined distance of the tire hub assembly.

25. The method according to claim 24, wherein the tire casing detecting step is performed by a tire sensor, the tire sensor arranged on the pedestal.

26. The method according to claim 25, further comprising:
- advancing the rasp pedestal toward the tire hub assembly at a first rate of speed until the tire sensor detects that the rasp pedestal is within a predetermined distance of the tire casing whereupon the rasp pedestal is advanced toward the tire hub assembly at a second rate of speed, the second rate less than the first rate.

27. A method for buffing a tire casing comprising:
- mounting the tire casing to a tire hub assembly for rotating the tire casing;
- rotating the tire casing;
- moving a rasp pedestal relative to the tire hub assembly toward the tire hub assembly, the rasp pedestal including a rasp head;
- engaging the rasp head with the tire casing;
- moving the rasp head along a predetermined buffing path to define a predetermined tire casing profile, the buffing path including a plurality of passes wherein the rasp head is moved across the width of the tire casing; and
- monitoring an operating parameter of one of the rasp pedestal and the tire hub assembly while moving the rasp head along the buffing path;
- comparing an actual value of the operating parameter to a predetermined target value of the parameter; and
- adjusting an operating characteristic of at least one of the rasp pedestal and the tire hub assembly such that the actual value of the operating parameter is urged toward the target value of the operating parameter.

28. The method according to claim 27, wherein the rasp pedestal includes a rasp drive motor for rotating the rasp head, the operating parameter comprises the current draw of a rasp drive motor, and the operating characteristic comprises the feed rate of the rasp pedestal as the pedestal traverses the tire casing mounted to the tire hub assembly to buff the casing.

29. The method according to claim 27, further comprising:
- moving the rasp pedestal with respect to the tire casing mounted to the tire hub assembly to respectively engage a texturing device mounted to the rasp pedestal with a pair of shoulders of the tire casing for a predetermined time to impart a predetermined texture upon the shoulders.

30. The method according to claim 29, further comprising:

rotating the texturing device by a rasp drive motor mounted to the rasp pedestal;

monitoring the current draw of the rasp drive motor;

moving the rasp pedestal toward the tire casing with the texturing device engaged with the tire casing until the current draw of the rasp drive motor reaches a predetermined value.

\* \* \* \* \*